(12) United States Patent
Lai et al.

(10) Patent No.: US 11,990,849 B2
(45) Date of Patent: May 21, 2024

(54) HYBRID MULTI-LEVEL INVERTER

(71) Applicant: Virginia Tech Intellectual Properties, Inc., Blacksburg, VA (US)

(72) Inventors: Jih-Sheng Lai, Blacksburg, VA (US); Moonhyun Lee, Torrance, CA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 17/587,405

(22) Filed: Jan. 28, 2022

(65) Prior Publication Data

US 2022/0247326 A1 Aug. 4, 2022

Related U.S. Application Data

(60) Provisional application No. 63/143,718, filed on Jan. 29, 2021.

(51) Int. Cl.
| | |
|---|---|
| *H02M 7/483* | (2007.01) |
| *H02M 1/00* | (2006.01) |
| *H02M 3/335* | (2006.01) |
| *H02M 5/453* | (2006.01) |
| *H02M 5/458* | (2006.01) |
| *H02M 7/49* | (2007.01) |
| *H02M 7/5387* | (2007.01) |

(52) U.S. Cl.
CPC ....... *H02M 7/4835* (2021.05); *H02M 1/0095* (2021.05); *H02M 3/33573* (2021.05); *H02M 7/53871* (2013.01); *H02M 5/453* (2013.01); *H02M 5/458* (2013.01); *H02M 5/4585* (2013.01); *H02M 7/483* (2013.01); *H02M 7/49* (2013.01)

(58) Field of Classification Search
CPC .... H02M 5/453; H02M 5/458; H02M 5/4585; H02M 7/483; H02M 7/49
See application file for complete search history.

(56) References Cited

U.S. PATENT DOCUMENTS

| | | |
|---|---|---|
| 3,867,643 A | 2/1975 | Baker et al. |
| 9,083,230 B2 * | 7/2015 | Narimani ............ H02M 7/4837 |

(Continued)

OTHER PUBLICATIONS

J.-S. Lai, and F. Z. Peng, "Multilevel Converters—A New Breed of Power Converters," IEEE Trans. on Industry Applications, vol. 32, No. 3, pp. 509-517, May/Jun. 1996.

(Continued)

*Primary Examiner* — Gary A Nash
(74) *Attorney, Agent, or Firm* — Johnson, Marcou, Isaacs & Nix, LLC

(57) ABSTRACT

This disclosure provides systems, methods, and apparatus for multi-level inverters. A hybrid binary cascaded multi-level inverter (BCMLI) is discussed that includes a plurality of H-bridge cells connected in a cascaded formation. DC input voltages of some of the H-bridge cells are provided by DC voltage sources. But inputs of other H-bridge cells coupled with capacitors instead. The H-bridge cells are operated to provide an AC output voltage at the output terminals of the inverter. One or more floating capacitor voltage controllers are used to vary one or more switching instances of the H-bridge cells such that a desirable level or charge is maintained across the one or more capacitors coupled with the input terminals of the H-bridge cells.

22 Claims, 31 Drawing Sheets

(56) References Cited

U.S. PATENT DOCUMENTS

| | | | | |
|---|---|---|---|---|
| 9,673,732 | B2* | 6/2017 | Deboy | H02M 7/49 |
| 9,929,662 | B2* | 3/2018 | Deboy | H02M 3/33592 |
| 10,218,285 | B2* | 2/2019 | Mihalache | H02M 1/12 |
| 2013/0343089 | A1* | 12/2013 | Gupta | H02M 7/49 363/16 |
| 2017/0229874 | A1* | 8/2017 | Rafsanjan | H02J 3/388 |
| 2018/0054057 | A1* | 2/2018 | Xu | H02J 3/1807 |
| 2018/0217902 | A1* | 8/2018 | Wang | H02M 7/483 |
| 2018/0375326 | A1* | 12/2018 | Shu | H02J 3/06 |
| 2019/0148947 | A1* | 5/2019 | Mao | H02J 3/381 307/78 |

OTHER PUBLICATIONS

J. Rodriguez, J.-S. Lai, and F. Z. Peng, "Multilevel Inverters: A Survey of Topologies, Controls, and Applications," IEEE Trans. on Industrial Electronics, vol. 49, No. 4, pp. 724-738, Aug. 2002.

M. D. Manjrekar, P. K. Steimer, and T. A. Lipo, "Hybrid Multilevel Power Conversion System: A Competitive Solution for High-Power Applications," IEEE Trans. on Industry Applications, vol. 36, No. 3, pp. 834-841, May/Jun. 2000.

C.-S. Yeh, C.-W. Chen, M. Lee and J.-S. Lai, "A Hybrid Modulation Method for Single-Stage Soft-Switching Inverter Based on Series Resonant Converter," IEEE Trans. on Power Electronics, Early Access, DOI: 10.1109/TPEL.2019.2948122, 2019.

M. Vijeh, M. Rezanejad, E. Samadaei, and K. Bertilsson, "A General Review of Multilevel Inverters Based on Main Submodules: Structural Point of View," IEEE Trans. on Power Electronics, vol. 34, No. 10, pp. 9479-9502, Oct. 2019.

Y.-S Lai, and F.-S. Shyu, "Topology for hybrid multilevel inverter," IEE Proceedings of Electric Power Applications, vol. 149, No. 6, pp. 449-458, Nov. 2002.

D. A. B. Zambra, C. Rech, and J. R. Pinheiro, "Comparison of Neutral-Point-Clamped, Symmetrical, and Hybrid Asymmetrical Multilevel Inverters," IEEE Trans. on Industrial Electronics, vol. 57, No. 7, pp. 2297-2306, Jul. 2010.

E. E. Espinosa, J. R. Espinoza, P. E. Melin, R. O. Ramirez, R. Villarroel, J. A. Munoz, and L. Moran, "A New Modulation Method for a 13-Level Asymmetric Inverter Toward Minimum THD," IEEE Trans. on Industry Applications, vol. 50, No. 3, pp. 1924-1933, May/Jun. 2014.

T. D. C. Busarello, A. Mortezaei, H. K. M. Paredes, A. Al-Durra, J. A. Pomilio, and M. G. Simoes, "Simplified Small-Signal Model for Output Voltage Control of Asymmetric Cascaded H-Bridge Multilevel Inverter," IEEE Trans. on Power Electronics, vol. 33, No. 4, pp. 3509-3519, Apr. 2018.

J. Dixon, J. Pereda, C. Castillo, and S. Bosch, "Asymmetrical Multilevel Inverter for Traction Drives Using Only One DC Supply," IEEE Trans. on Vehicular Technology, vol. 59, No. 8, pp. 3736-3743, Oct. 2010.

J. Pereda, and J. Dixon, "High-Frequency Link: A Solution for Using Only One DC Source in Asymmetric Cascaded Multilevel Inverters," IEEE Trans. on Industrial Electronics, vol. 58, No. 9, pp. 3884-3892, Sep. 2011.

J. Pereda, and J. Dixon, "Cascaded Multilevel Converters: Optimal Asymmetries and Floating Capacitor Control," IEEE Trans. on Industrial Electronics, vol. 60, No. 11, pp. 4784-4793, Nov. 2013.

M. S. Manoharan, A. Ahmed, and J.-H. Park, "A PV Power Conditioning System Using Nonregenerative Single-Sourced Trinary Asymmetric Multilevel Inverter With Hybrid Control Scheme and Reduced Leakage Current," IEEE Trans. on Power Electronics, vol. 32, No. 10, pp. 7602-7614, Oct. 2017.

A. Ahmed, M. S. Manoharan, and J.-H. Park, "An Efficient Single-Sourced Asymmetrical Cascaded Multilevel Inverter With Reduced Leakage Current Suitable for Single-Stage PV Systems," IEEE Trans. on Energy Conversion, vol. 34, No. 1, pp. 211-220, Mar. 2019.

S. Vazquez, J. I. Leon, L. G. Franquelo, J. J. Padilla, and J. M. Carrasco, "DC-Voltage-Ratio Control Strategy for Multilevel Cascaded Converters Fed With a Single DC Source," IEEE Trans. on Industrial Electronics, vol. 56, No. 7, pp. 2513-2521, Jul. 2009.

H. Sepahvand, J. Liao, M. Ferdowsi, and K. A. Corzine, "Capacitor Voltage Regulation in Single-DC-Source Cascaded H-Bridge Multilevel Converters Using Phase-Shift Modulation," IEEE Trans. on Industrial Electronics, vol. 60, No. 9, pp. 3619-3626, Sep. 2013.

S. Ziaeinejad, A. Mehrizi-Sani, "PWM A-CHB Converter Based on Trinary Multilevel Converter: Topology, Switching Algorithm, and Stability Analysis," IEEE Trans. on Industrial Electronics, vol. 66, No. 6, pp. 4166-4176, Jun. 2019.

* cited by examiner

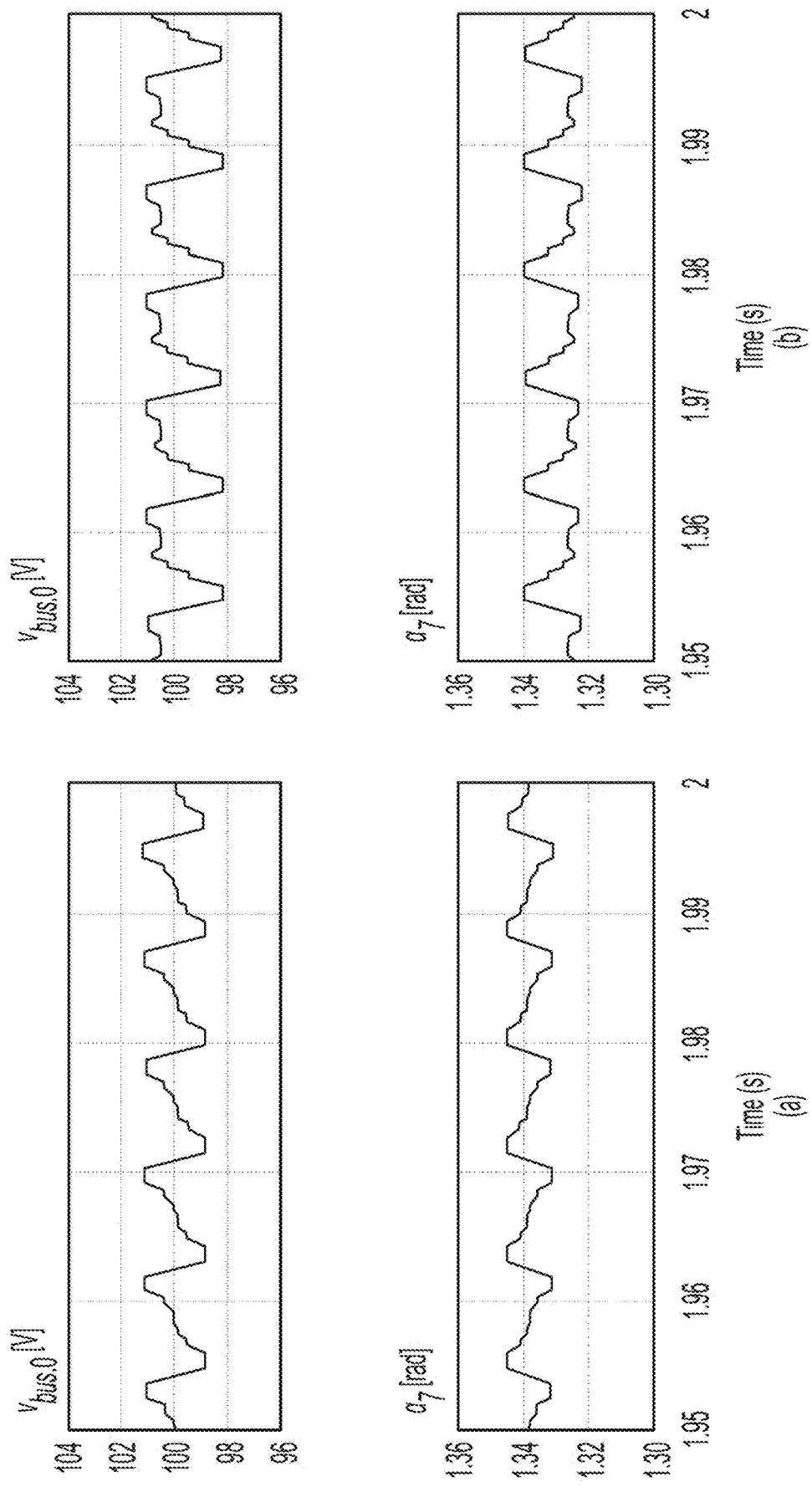
Figure 12 (contd.)

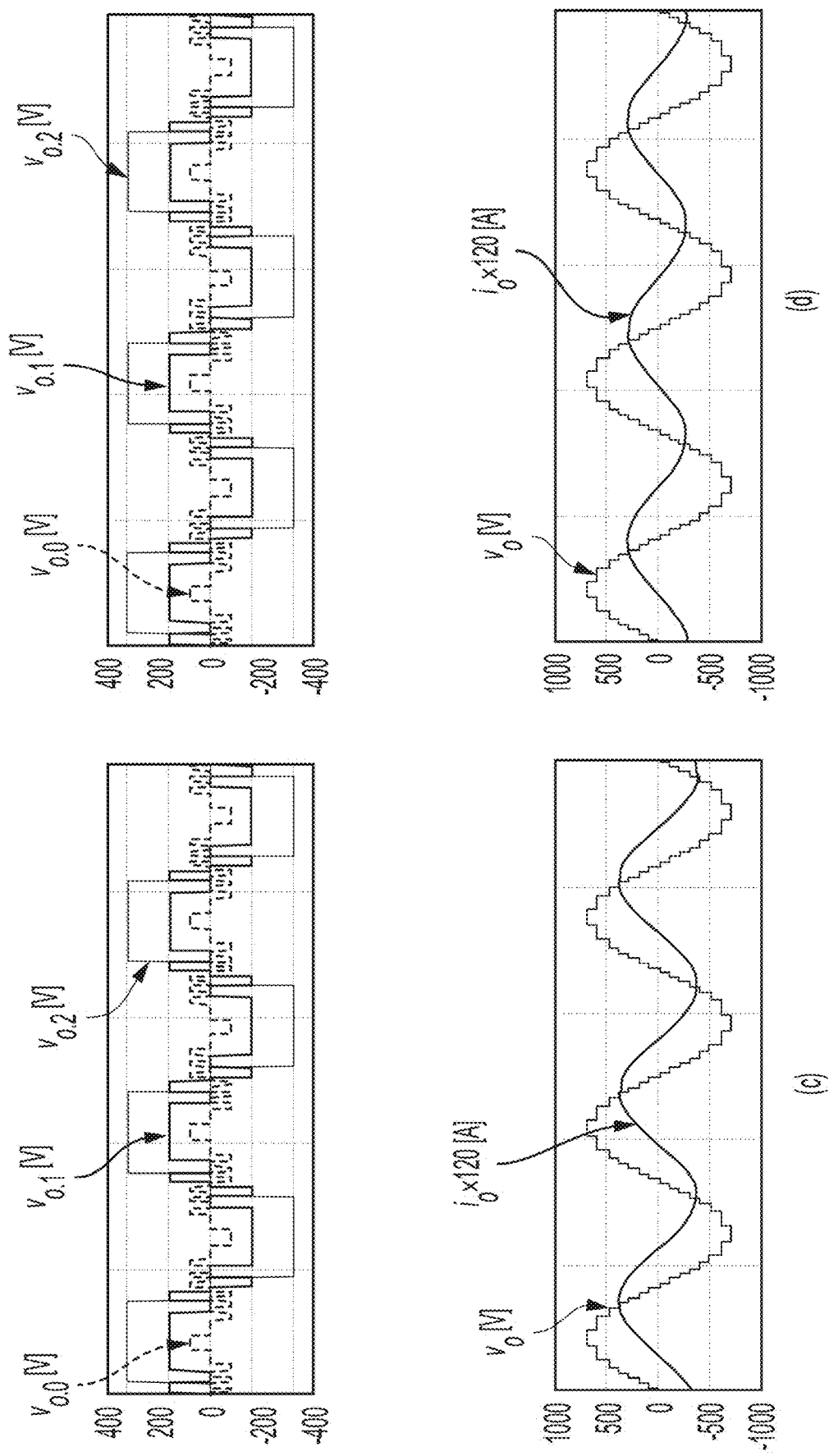
Figure 12 (contd.)

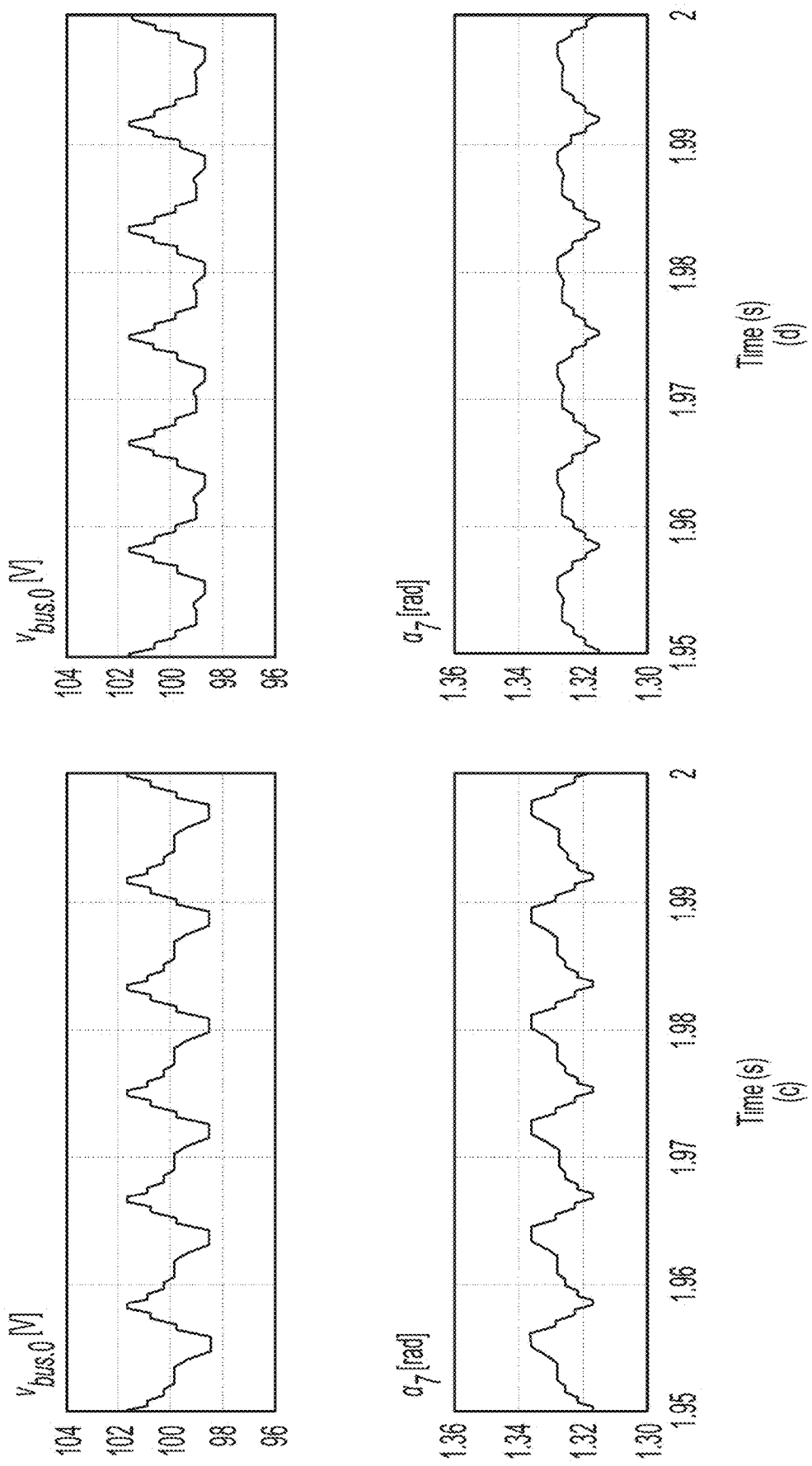
Figure 12 (contd.)

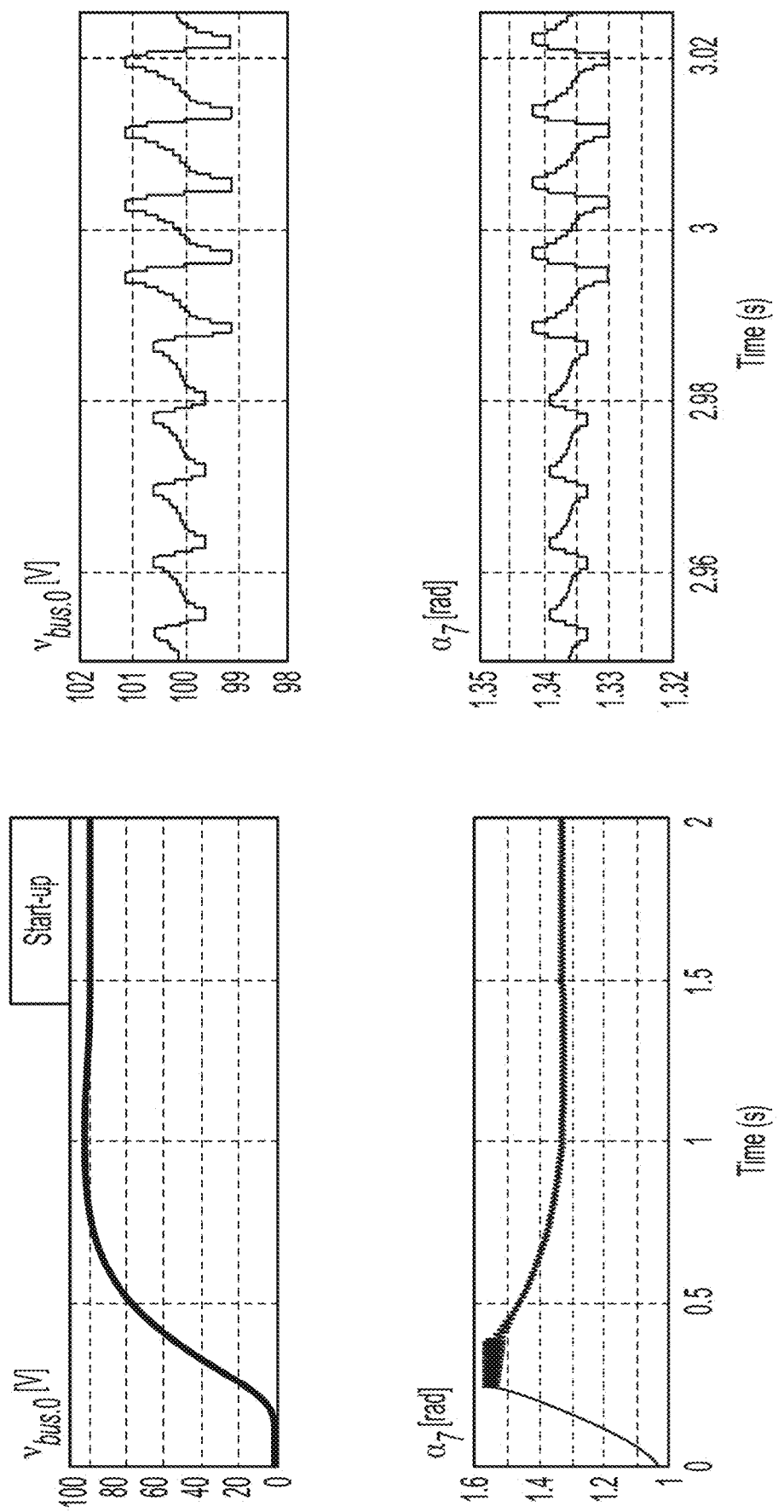
Figure 13 (contd.)

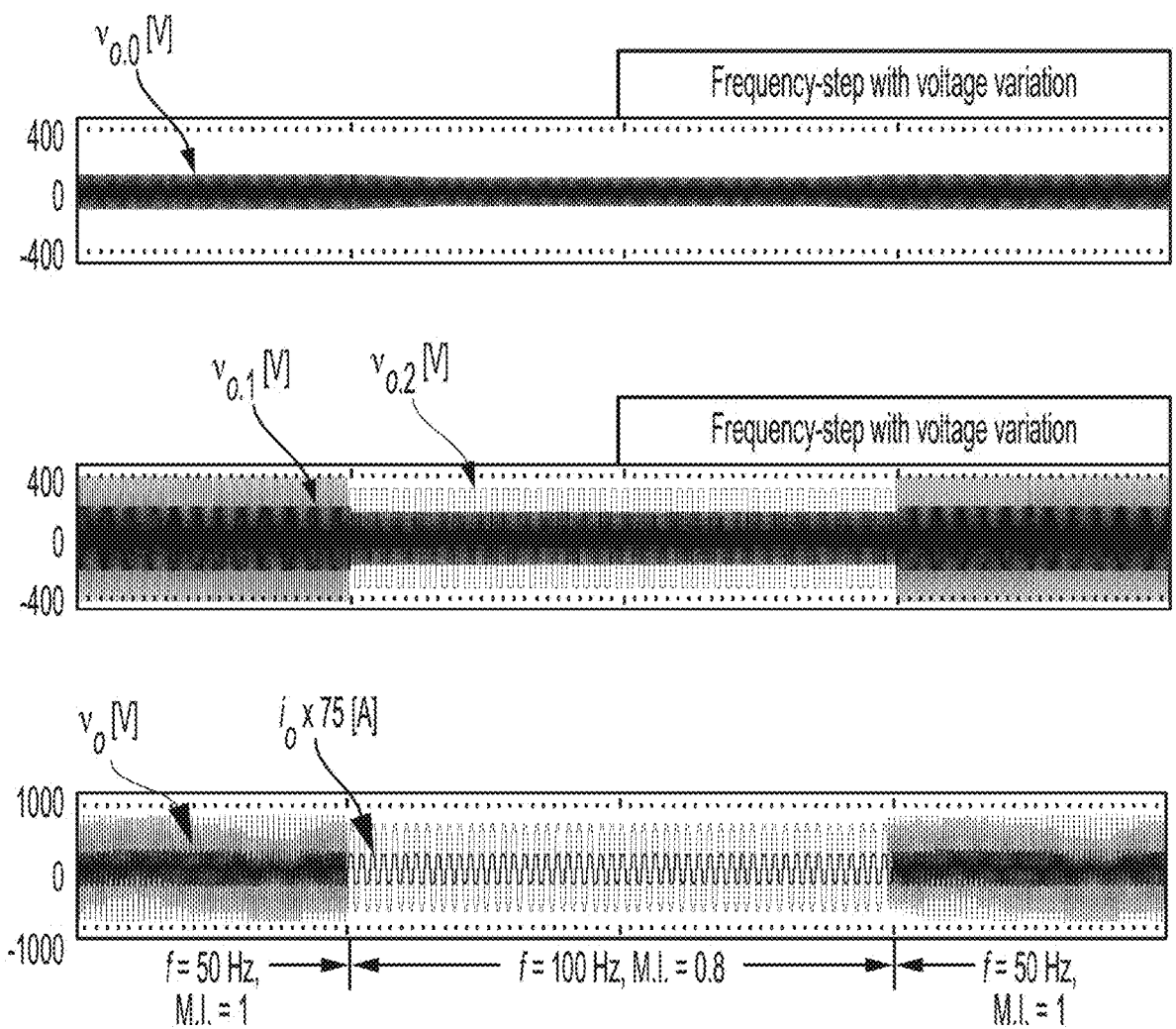
Figure 14 (contd.)

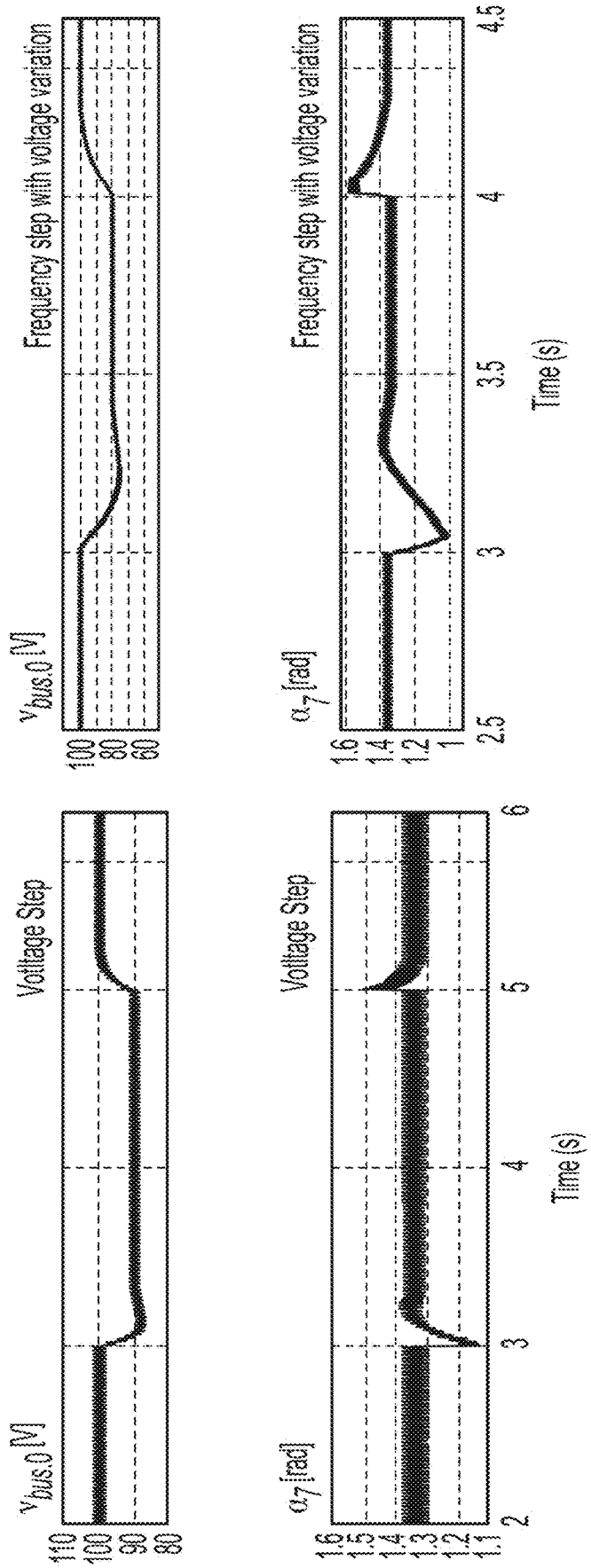
Figure 14 (contd.)

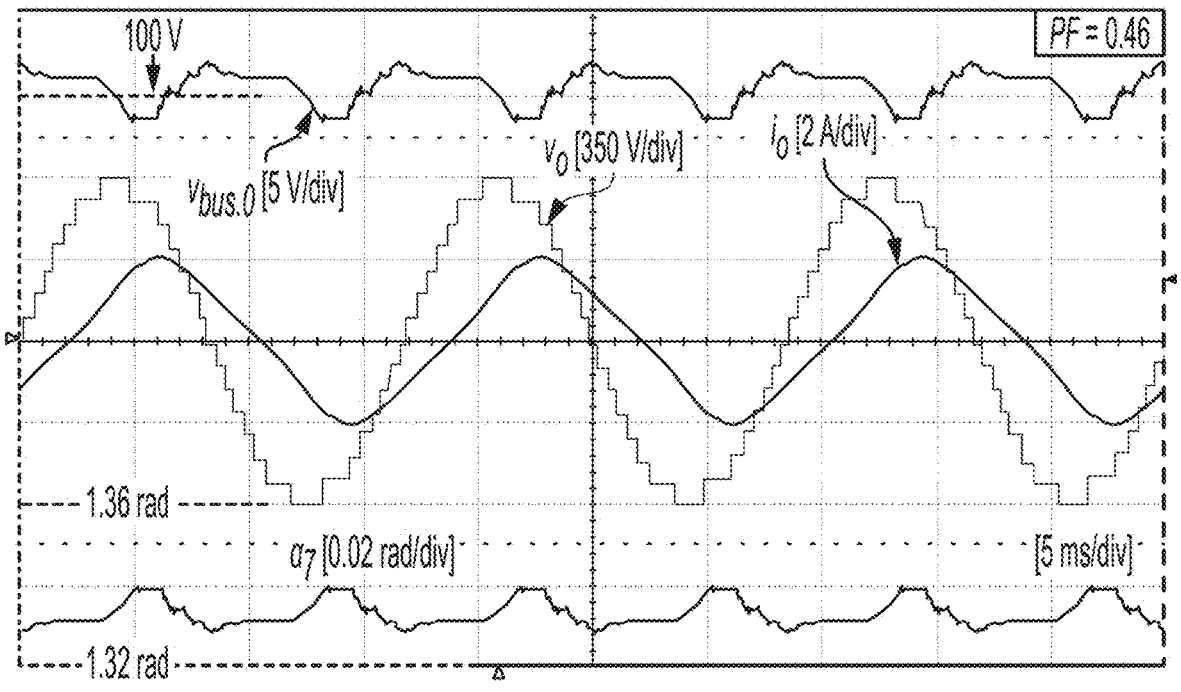
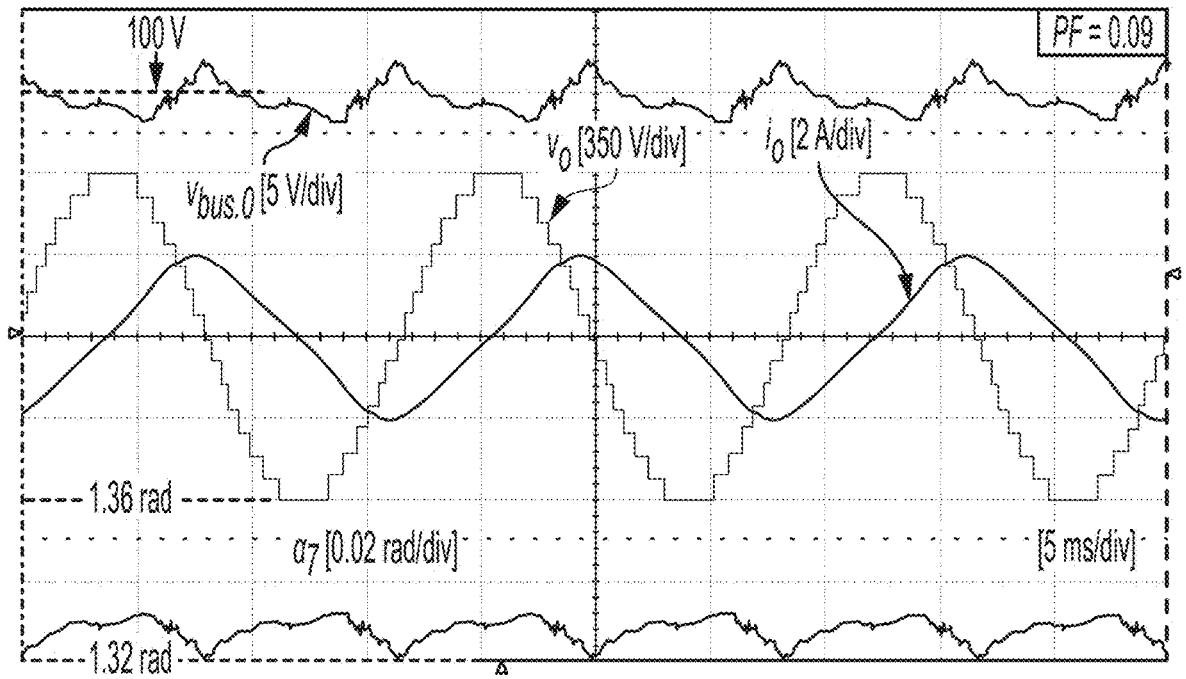
Figure 17 (contd.)

HYBRID MULTI-LEVEL INVERTER

CROSS-REFERENCE TO RELATED APPLICATIONS

This application claims priority to U.S. Provisional Application No. 63/143,718, entitled "Hybrid Multi-Level Inverter," filed Jan. 29, 2021, which is incorporated by reference herein in its entirety.

STATEMENT REGARDING FEDERALLY SPONSORED RESEARCH OR DEVELOPMENT

This invention was made with government support under award DE-AR0000904 awarded by the Department of Energy. The government has certain rights in the invention.

TECHNICAL FIELD

This disclosure relates to the field of power systems, and in particular to power converters.

DESCRIPTION OF THE RELATED TECHNOLOGY

Multi-level inverters have been used in wide variety of applications. A multi-level inverter can receive direct current (DC) input voltages and generate an alternating current (AC) output voltage at its output terminals. The output voltage can be a stepwise voltage formed by changing switching configurations of constituent hybrid bridge cells at various time instances over a voltage cycle.

SUMMARY

In some aspects, the techniques described herein relate to a multi-level inverter, including: n H-bridge cells, each H-bridge cell of the n H-bridge cells configured to selectively provide at its output terminals one of: a zero voltage, a positive polarity of a voltage at its input terminals, and a negative polarity of the voltage at its input terminals, wherein the corresponding input terminals of each H-bridge cell of then H-bridge cells is configured to be coupled to one of n DC voltage sources, wherein at least two of the n DC voltage sources have a different voltage magnitudes. The multi-level inverter further includes m H-bridge cells, each H-bridge cell of the m H-bridge cells having a capacitor coupled in parallel with its input terminal, the each H-bridge cell of the m H-bridge cells configured to selectively provide one of: charging the capacitor from its output terminals, discharging the capacitor to its output terminals, and providing zero voltage at its output terminals, wherein the n H-bridge cells and the m H-bridge cells are connected in a cascade formation such that a voltage output of the multi-level inverter is equal to at least a sum of output voltages of the n H-bridge cells and the m H-bridge cells. The multi-level inverter also includes a controller coupled with the n H-bridge cells and the m H-bridge cells where the controller is configured to: determine a first half-cycle period and a second subsequent half-cycle period of a same duration as the first half-cycle period, each of the first half-cycle period and the second half-cycle period including a set of switching instances, wherein each switching instance in the set of switching instances is determined at least in part based upon the voltage magnitudes of each of then DC voltage sources, and selectively control then H-bridge cells and the m H-bridge cells at each switching instance of the set of switching instances of the first half-cycle period to generate a step-wise increasing followed by a step-wise decreasing voltage output of the multi-level inverter and selectively control the n H-bridge cells and the m H-bridge cells at each switching instance of the set of switching instances of the second half-cycle period to generate a step-wise decreasing followed by a step-wise increasing voltage output of the multi-level inverter.

In some aspects, the techniques described herein relate to a multi-level inverter further including the n DC voltage sources, wherein the corresponding input terminals of each H-bridge cell of then H-bridge cells is coupled to a DC voltage source of the n DC voltage sources. In some aspects, the techniques described herein relate to a multi-level inverter, wherein the n DC voltage sources have progressively increasing voltage values. In some aspects, the techniques described herein relate to a multi-level inverter, wherein the n DC voltage sources have values progressively increasing by a power of 2.

In some aspects, the techniques described herein relate to a multi-level inverter, wherein the controller is configured to selectively control at least one H-bridge cell of the m H-bridge cells to discharge the respective capacitor to its respective output terminals when the voltage output of the multi-level inverter is at its peak positive or peak negative value. In some aspects, the techniques described herein relate to a multi-level inverter, wherein the controller is configured to selectively control at least one H-bridge cell of the m H-bridge cells to charge the respective capacitor from its respective output terminals when the voltage output of the multi-level inverter is not at its peak positive or peak negative value.

In some aspects, the techniques described herein relate to a multi-level inverter, wherein n is greater than m. In some aspects, the techniques described herein relate to a multi-level inverter, wherein the controller configured to vary at least one switching instance of the set of switching instances in the first half-cycle and the second half-cycle based on deviation of voltage of at least one capacitor associated with the m H-bridge cells from their corresponding predetermined value. In some aspects, the techniques described herein relate to a multi-level inverter, wherein the controller configured to vary the at least one switching instance of the set of switching instances in the first half-cycle and the second half-cycle to maintain average voltages of the at least one capacitor associated with the m H-bridge cells at their corresponding predetermined value.

In some aspects, the techniques described herein relate to a multi-level inverter, wherein the controller is configured to vary at least one switching instance of the set of switching instances in the first half-cycle and the second half-cycle such that an average charge into at least one capacitor associated with the m H-bridge cells is substantially equal to zero over the first half-cycle and second half-cycle. In some aspects, the techniques described herein relate to a multi-level inverter, wherein the at least one switching instance is associated with the output voltage of the multi-level inverter having a positive or negative peak value.

In some aspects, the techniques described herein relate to a method for controlling a multi-level inverter including: n H-bridge cells, each H-bridge cell of the n H-bridge cells configured to selectively provide at its output terminals one of: a zero voltage, a positive polarity of a voltage at its input terminals, and a negative polarity of the voltage at its input terminals, wherein the corresponding input terminals of each H-bridge cell of the n H-bridge cells is configured to be coupled to one of n DC voltage sources, wherein at least two of the n DC voltage sources have a different voltage magnitudes; and m H-bridge cells, each H-bridge cell of the m H-bridge cells having a capacitor coupled in parallel with its input terminal, the each H-bridge cell configured to selectively provide one of: a charging the capacitor from its output terminals, a discharging the capacitor to its output terminals, and a providing zero voltage at its output terminals, wherein the n H-bridge cells and the m H-bridge cells are connected in a cascade formation such that a voltage output of the multi-level inverter is equal to at least a sum of output voltages of the n H-bridge cells and the m H-bridge cells, the method including: determining a first half-cycle period and a second subsequent half-cycle period of a same duration as the first half-cycle period, each of the first half-cycle period and the second half-cycle period including a set of switching instances, wherein each switching instance in the set of switching instances is determined at least in part based upon the voltage magnitudes of each of the n DC voltage sources, selectively controlling the n H-bridge cells and the m H-bridge cells at each switching instance of the set of switching instances of the first half-cycle period to generate a step-wise increasing followed by a step-wise decreasing voltage output of the multi-level inverter, and selectively controlling the n H-bridge cells and the m H-bridge cells at each switching instance of the set of switching instances of the second half-cycle period to generate a step-wise decreasing followed by a step-wise increasing voltage output of the multi-level inverter.

In some aspects, the techniques described herein relate to a method, wherein the n DC voltage sources have progressively increasing voltage values. In some aspects, the techniques described herein relate to a method, wherein the n DC voltage sources have values progressively increasing by a power of 2. In some aspects, the techniques described herein relate to a method, further including: selectively controlling at least one H-bridge cell of the m H-bridge cells to discharge the respective capacitor to its respective output terminals when the voltage output of the multi-level inverter is at its peak positive or peak negative value. In some aspects, the techniques described herein relate to a method, further including: selectively controlling at least one H-bridge cell of the m H-bridge cells to charge the respective capacitor from its respective output terminals when the voltage output of the multi-level inverter is not at its peak positive or peak negative value.

In some aspects, the techniques described herein relate to a method, wherein n is greater than m. In some aspects, the techniques described herein relate to a method, further including: varying at least one switching instance of the set of switching instances in the first half-cycle and the second half-cycle based on deviation of voltage of at least one capacitor associated with the m H-bridge cells from their corresponding predetermined value. In some aspects, the techniques described herein relate to a method, further including: varying the at least one switching instance of the set of switching instances in the first half-cycle and the second half-cycle to maintain average voltages of the at least one capacitor associated with the m H-bridge cells at their corresponding predetermined value.

In some aspects, the techniques described herein relate to a method, further including: varying at least one switching instance of the set of switching instances in the first half-cycle and the second half-cycle such that an average charge into at least one capacitor associated with the m H-bridge cells is substantially equal to zero over the first half-cycle and second half-cycle. In some aspects, the techniques described herein relate to a method, wherein the at least one switching instance is associated with the output voltage of the multi-level inverter having a positive or negative peak value. In some aspects, the techniques described herein relate to a method, wherein the multi-level inverter further includes the n DC voltage sources, wherein the corresponding input terminals of each H-bridge cell of the n H-bridge cells is coupled to a DC voltage source of the n DC voltage sources.

BRIEF DESCRIPTION OF THE DRAWINGS

Like reference numbers and designations in the various drawings indicate like elements.

DETAILED DESCRIPTION

Figure 1A:
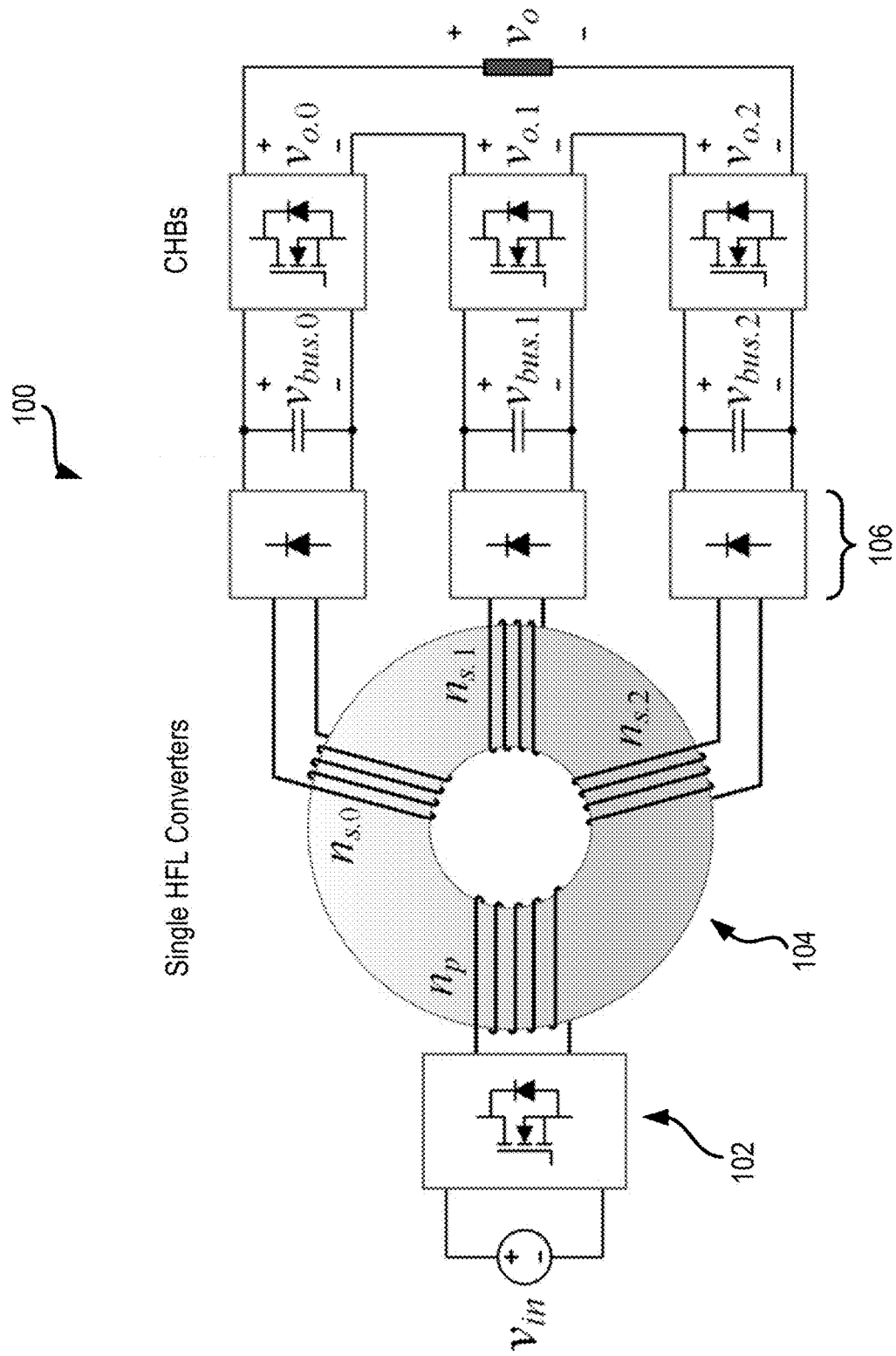
FIGS. 1A and 1B show example high-frequency link (HFL)-based multilevel inverters with single voltage source and single and multi-core transformers.

The various concepts introduced above and discussed in greater detail below may be implemented in any of numerous ways, as the described concepts are not limited to any particular manner of implementation. Examples of specific implementations and applications are provided primarily for illustrative purposes.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Prior to describing the various aspects of the present disclosure, the following definitions are provided and should be used unless otherwise indicated. Additional terms may be defined elsewhere in the present disclosure.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of."

As used herein, the term "and/or" includes any and all combinations of one or more of the associated listed items. Expressions such as "at least one of," when preceding a list of elements, modify the entire list of elements and do not modify the individual elements of the list.

As used in the specification and the appended claims, the singular forms "a," "an" and "the" include plural referents unless the context clearly dictates otherwise. Thus, for example, reference to "a proton beam degrader," "a degrader foil," or "a conduit," includes, but is not limited to, two or more such proton beam degraders, degrader foils, or conduits, and the like.

The various concepts introduced above and discussed in greater detail below may be implemented in any of numerous ways, as the described concepts are not limited to any particular manner of implementation. Examples of specific implementations and applications are provided primarily for illustrative purposes.

As used herein, the terms "optional" or "optionally" means that the subsequently described event or circumstance can or cannot occur, and that the description includes instances where said event or circumstance occurs and instances where it does not.

I. INTRODUCTION

This application includes discussion of hybrid binary cascaded multilevel inverters (BCMLIs). In some embodiments, the BCMLIs can employ front-end high-frequency-link (HFL) converters to provide DC voltages. At least one purpose of HFL-converters is to a boost DC-source voltage to bus voltages in a binary ratio. In some embodiments, one of the HFL-converters is removed from the system and is instead replaced with a floating capacitor coupled in parallel with the input terminals of the H-bridge cell. The voltage of the floating capacitor can be controlled by a floating-capacitor-voltage (FCV) controller. Compared to the conventional BCMLI, the system size and cost can be significantly reduced while maintaining promising features including multi-level output, high voltage gain, galvanic isolation and reactive power capability. The FCV control can utilize one of the switching angles at voltage-level transitions as a control variable in single-loop design, which facilitates control simplicity. The hybrid BCMLI with the FCV control has advantages of voltage gain, isolation capability, reactive supply and simple control system over state-of-the-art multilevel inverter topologies with FCV control methods.

Multilevel inverters can be used in wide-range voltage and power applications. In comparison with other inverters, multi-level inverters can have low total-harmonic-distortion (THD), low device stresses and reduced fewer filter requirements. Types of multi-level inverters can include, for example, cascaded H-bridge (CHB), neutral point clamped and flying capacitor inverters. CHB inverters provide benefits such as low modular manufacturing cost, expandability, high efficiency and suitability for fault-tolerant applications.

In CHB multilevel inverter system, an isolated dc source can be used per H-bridge module. k-CHB modules with symmetrical n-sources can provide a total output voltage level of (2k+1). Thus, output voltage level and waveform quality can be significantly improved with a higher k. However, this also results in a large number of voltage sources and inverter modules as compared to other multi-level inverter types with similar output voltage levels. In some instances, CHB inverters with asymmetrical dc-sources can be used. Such inverters can be referred to as asymmetrical cascaded multilevel inverters. Example inverter topologies can include binary and trinary cascaded multilevel inverters in 3-module structures, of which source voltages are in (1:2:4) and (1:3:9) ratios; 15-level (THD 5.9%) and 27-level (THD 3.1%) output voltages are achievable with the binary and trinary inverters, respectively. With re-sources and n-CHB modules, in theory, the binary and trinary topologies can obtain $2(k+1)-1$ and 3 k maximum voltage levels, respectively.

Nevertheless, asymmetrical inverter topologies still employ multiple dc-sources and such voltage sources with specific ratios may be difficult to implement. As a partial solution, some example inverters implement front-end high-frequency-link (HFL) converters to provide asymmetric bus voltages from a single dc-source. The HFL-transformers can facilitate input-output galvanic isolation and high voltage gain so that inverters can be candidates for higher voltage applications like industrial drives. FIG. 1A shows an example HFL-based multilevel inverter 100 with single dc-source. The single-HFL converters utilize one primary bridge 102, a single transformer 104 and individual secondary rectifiers 106. While this system topology can have a benefit of reduced components, the transformer 104 core would have to be designed with a large core with wide window-area to handle full power rating. Moreover, control complexity due to complicated modulation, cross-regulation issue and switching frequency limitation can be introduced when multiple bus voltages are controlled through a single core. The multi-HFL converters in FIG. 1B can adopt separate power paths from input source to load. Although the component count is higher than that of single-HFL system, several features including control simplicity, low power rating of circuits and reduced size of cores may be more desirable in some implementations.

Figure 1B:
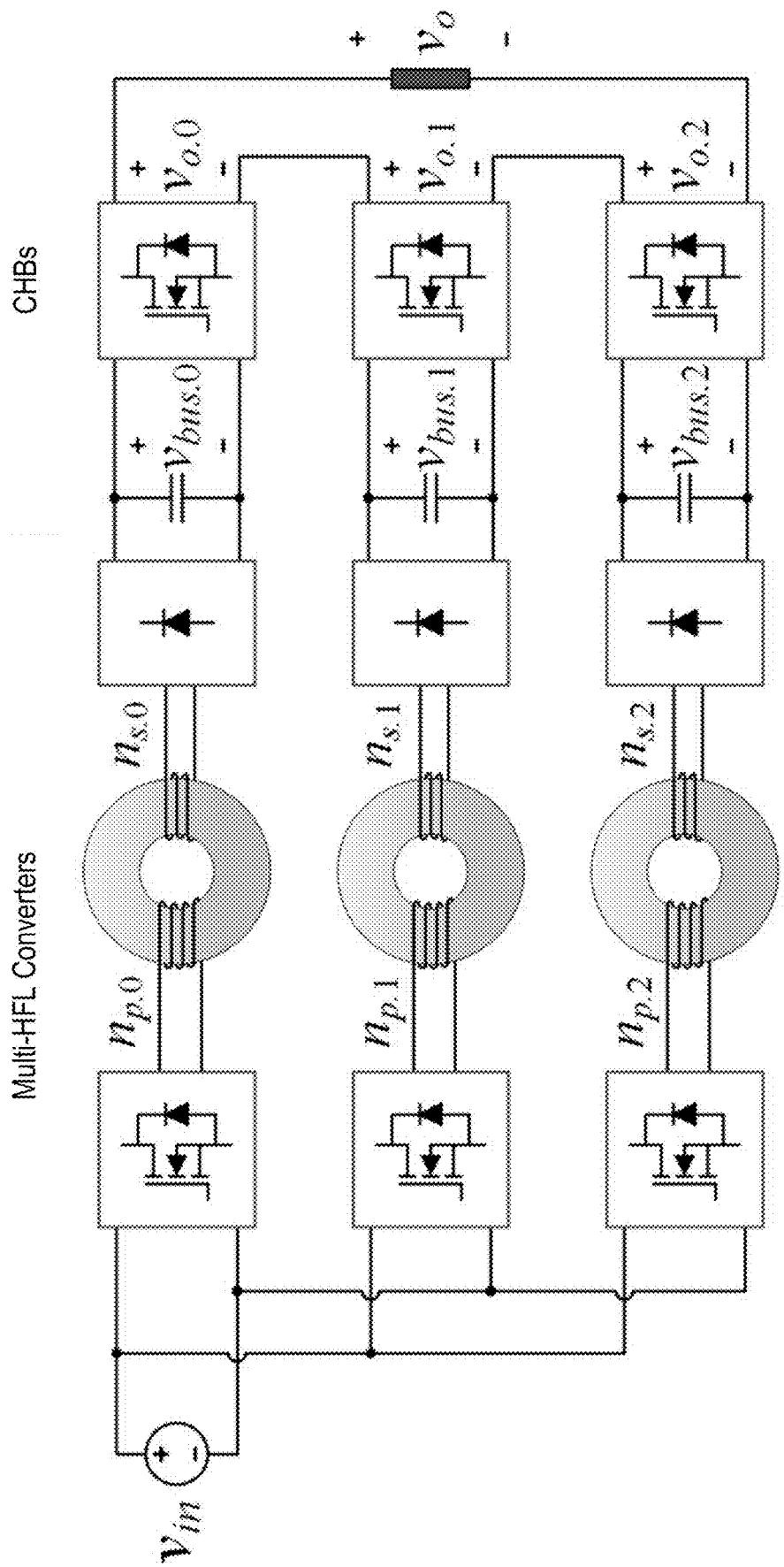

Based on the single-phase multi-HFL structures in FIG. 1B, some inverter configurations can be designed to reduce the number of HFL-converters for system size and cost reduction. For example, one of the voltage sources can be replaced with a floating capacitor, resulting in a hybrid topology formed with a combination of CHB inverters and flying capacitor type inverters. Since charge-balanced capacitor at designated voltage level is desirable for system output voltage quality, FCV control under variations of output voltage and power can be used. In some examples, a single-source trinary cascaded multilevel inverter can include a front-end boost converter and magnetically coupled charge-pumps as HFL-converters. This configuration can result in reduced size and cost of the HFL and enhanced core utilization by the charge-pumps. In some other examples, the main HFL-converter for a particular voltage level can be removed and a dc-source can be directly connected to the bus. As a result, a dual-half-bridge converter is positioned between two other voltage level floating buses as a HFL-converter. This can allow bi-directional power flow and two floating capacitors can be controlled to desired voltages. In some examples, trinary inverters deliver power through charge-pumps and dual-half-bridges at low percentages of full power ratings with resulting system efficiency of over 96%, while obtaining 27-level output with low THD. However, this also results in losing input-output galvanic isolations, limited power range of HFL-converters and restricted modulation index below 0.85, which can limit their use to low voltage applications.

In some examples, HFL-converters can be removed to form a single-source asymmetric multilevel inverter including CHB stages. In some example implementations, two CHB modules can be used and can also include control methods to regulate one floating capacitor voltage in (1:k) ratio with a single DC-source voltage. In some other examples, three CHBs can be used and FCV control for two capacitors in (1:k:k) ratio can be included. Two floating capacitors can be controlled concurrently to k=0.38. In yet another example inverter a 9-level output can be generated using purely inductive-load supply. However, in some such inverters, FCV control methods have non-reachable and unstable voltage regions. Low voltage level and severe control complexity are also relative weak points.

As discussed herein, a FCV control for a hybrid binary cascaded multilevel inverter (BCMLI) is introduced, which reduces the need for HFL converters and LC output filters for PWM-based output voltage. The FCV control is applied to floating capacitors with selected modulations from a truth table corresponding to a BCMLI operation. A switching angle at peak voltage-level transition is designed as control variable. For feedback controller design, small-signal transfer function between the switching angle and voltage is derived and inherent stability of the FCV control is analyzed. For $2 \cdot V_{dc}$ and $4 \cdot V_{dc}$ (or input voltages of other H-bridge cells that are connected to DC sources instead of floating capacitors) regulations, full-bridge LLC converters can be implemented in the multi-HFL form, such as, for example, that shown in FIGS. 1A and 1B, and designed to have almost constant voltage gains by fixed duty-ratio operations at resonant frequencies. With the simple control structures, the example hybrid BCMLI can achieve 15-level output and reasonable THD without losing modulation index. Though the system has lower voltage level and higher THD than some trinary inverters in, it can easily obtain higher voltage-gain by appropriate transformers design. Moreover, the proposed FCV control can achieve stable operation without losing modulation index and wide range of power-factor operations from pure real power up to pure reactive power. Input-output galvanic isolation is another merit eligible for high voltage systems. The features of high-voltage gain design, robust input/output isolation, wide-range power factor operations, and low control complexity are the advantages which have not been exhibited in combination by other hybrid-type topologies. Thus, it can be noted that the hybrid BCMLI with the proposed FCV control has comparative topological advantages not only over conventional CHB-based MLIs, but also over state-of-the-art hybrid MLIs which realized single-sourced asymmetric bus voltages and reduction of HFL-converters by their own FCV control methods. The detailed comparison results with state-of-the-art hybrid topologies are also discussed herein.

In Section II, system configuration, modulation schemes and design considerations of the hybrid BCMLI are introduced. In Section III, dynamic model related to the floating capacitor are analyzed and the proposed FCV control is explained in detail. In Section IV, comparative assessments with state-of-the-art asymmetrical cascaded multilevel inverters is carried out. In Section V, experimental verifications with a BCMLI prototype are presented at 700 Vpk output and 1-kW ratings to verify the effectiveness of the proposed system and control.

II. HYBRID BCMLI

A. System Configuration

Figure 2:
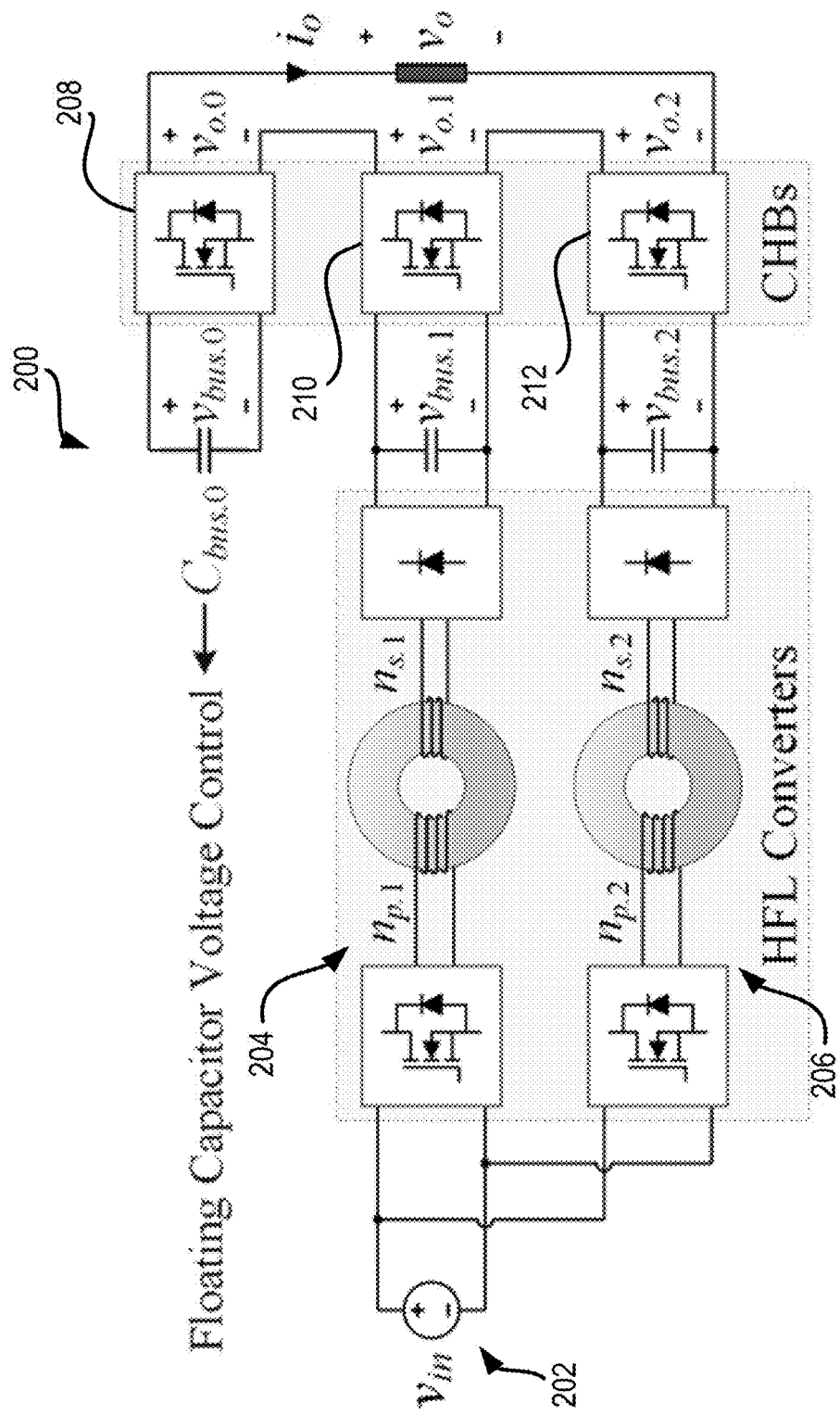
FIG. 2 shows an example configuration of a hybrid binary cascaded multilevel inverter (BCMLI) system.

FIG. 2 shows an example configuration of a hybrid BCMLI system 200. Two separate HFL-converters are supplied by a single dc-source $v_{in}$ 202. In particular, a first HFL-converter 204 and a second HFL-converter 206 are supplied by the single dc-source $v_{in}$ 202. The front-end HFL-converters (204 and 206) regulate the bus voltages $V_{bus1}$ and $V_{bus2}$ to different values and the voltage of floating bus-capacitor $V_{bus0}$ at the top is controlled by a FCV control devised in Section III. In this section, the floating capacitor $C_{bus0}$ is assumed to be controlled properly at desired voltage in order to explain basic topology and modulation schemes. Then, the three bus voltages can be expressed as (1).

$$v_{bus.0} = 2^0 \cdot V_{dc} = 1 \cdot V_{dc}$$

$$v_{bus.1} = 2^1 \cdot V_{dc} = 2 \cdot V_{dc} \quad (1)$$

$$v_{bus.2} = 2^2 \cdot V_{dc} = 4 \cdot V_{dc}$$

where $V_{dc}$ is a base dc-voltage value for the hybrid BCMLI. In some example implementations, $V_{dc}$ can have a magnitude between a few volts to hundreds of volts. In some example implementations, $V_{dc}$ can have a magnitude between a few volts to a few thousand volts. The upper limit to the magnitude can depend upon the specifications of the semiconductor devices utilized to implement the BCMLI. It should be noted that $v_{bus1}$ and $V_{bus2}$ (or generally $v_{bus-n}$) correspond to n H-bridge cells that have voltage sources coupled with their respective input terminals. The n DC voltage sources have progressively increasing voltage values, such as, for example as linear or non-linear multiples of a constant, or by the power of a constant (e.g., 2, 3, etc.) or any other suitable function that provides progressively increasing voltage values. $V_{bus0}$ (or generally $V_{bus-m}$) corresponds to the voltage across the capacitor $C_{bus0}$ (or generally $C_{bus-m}$) for and across the input terminals of the topmost H-bridge cell (or generally to m H-bridge cells having floating capacitors coupled in parallel with their respective input terminals). The n H-bridge cells and the m H-bridge cells are connected in a cascade formation such that a voltage output of the multi-level inverter is equal to at least a sum of output voltages of the n H-bridge cells and the m H-bridge cells. In some examples, the number of n H-bridge cells can be greater than the number of m H-bridge cells. In some examples, the number of n H-bridge cells can be equal to or even less than the number of m H-bridge cells.

The n H-bridge cells and the m H-bridge cells are connected at the output in a cascade configuration. In particular, the n and m H-bridge cells are connected in a manner such that a voltage output of the multi-level inverter is equal to at least a sum of output voltages of then H-bridge cells and the m H-bridge cells. For example, referring again to FIG. 2, the CHBs include two H-bridge cells (n=2) that have their respective inputs terminals coupled with voltage sources, and include one H-bridge cell (m=1) that has its input terminals coupled with a capacitor $C_{bus0}$.

The output voltage $v_o$ at the output of the hybrid BCMLI system 200 is equal to the sum of the output voltages of each of the CHB modules. For example, the CHB modules include a first CHB module 208, a second CHB module 210, and a third CHB module 212. Each CHB module has a first output terminal (a +ve output terminal) and a second output terminal (a −ve output terminal). The second output terminal (the −ve output terminal) of the first CHB module 208 is coupled with the first output terminal (the +ve output terminal) of the second CHB module 210. The second output terminal (the −ve output terminal) of the second CHB module 210 is coupled with the first output terminal (the +ve output terminal) of the third CHB module 212. The output voltage $v_o$ is measured between the first terminal (the +ve terminal) of the first CHB module 208 and the second terminal (the −ve terminal) of the third CHB module 212, where the output voltage is a sum of the output voltages of the CHB modules.

Figure 3:
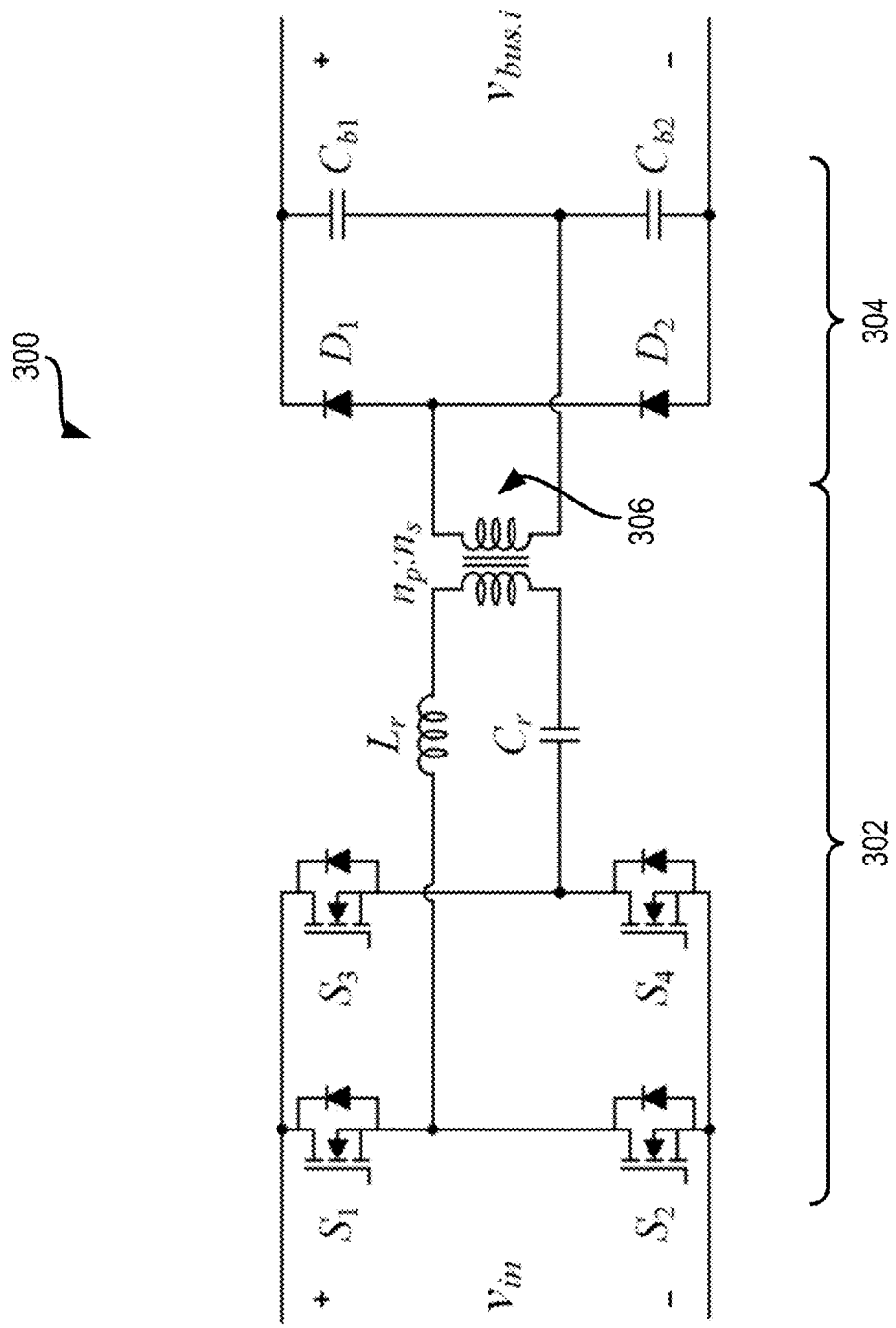
FIG. 3 shows an example implementation of the front-end converters shown in FIG. 2 using a full-bridge LLC converter with a secondary voltage doubler.

FIG. 3 shows an example implementation 300 of the front-end converters (204 and 206) shown in FIG. 2 using a full-bridge LLC converter 302 with secondary voltage doubler 304. The implementation in FIG. 3 can obtain zero-voltage switching, steady voltage-gain as dc-transformer and input-output galvanic isolation by the high-frequency transformer 306. The transformer turn-ratio design can create high $2 \cdot V_{dc}$ and $4 \cdot V_{dc}$ bus voltages synergizing with voltage-doubler so that high step-up ratio from $v_{in}$ to $v_o$ is possible, which is a certain advantage for high voltage inverter systems. The voltage gain of i-th (i=1, 2) LLC converter in FIG. 3 can be expressed by $M_{mod,i} = v_{bus,i}/v_{in} = 2 \cdot (n_{s,i}/n_{p,i})$ if switching frequency is at resonant frequency. It should be noted that the HFL converters shown in FIG. 3 are only examples, and that other DC voltage sources such as, for example, batteries and DC-DC converters also can be employed.

Figure 4:
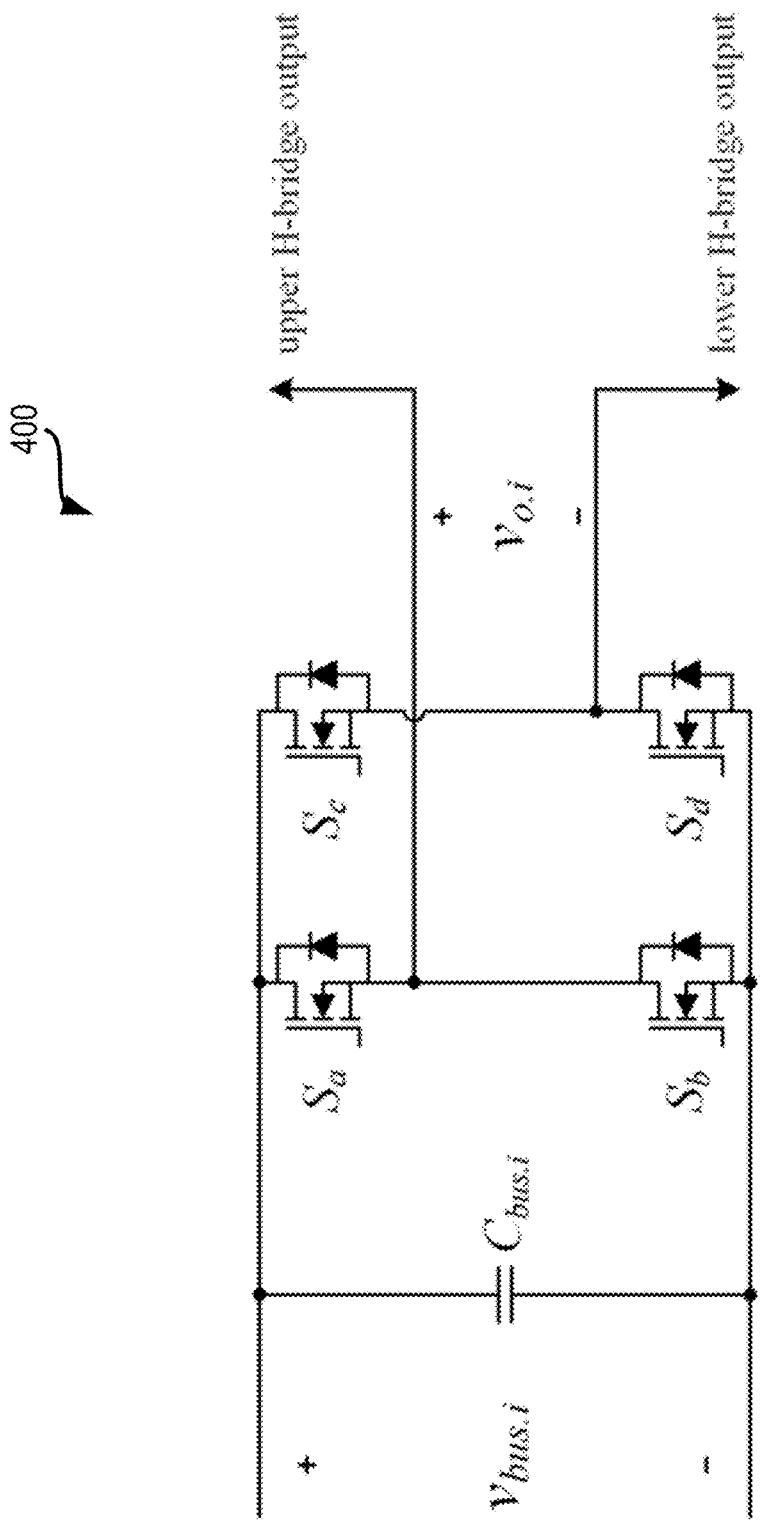
FIG. 4 shows an example H-bridge cell converter that can be used as an cascaded H-bridge (CHB) cell shown in FIG. 2.
Figure 5:
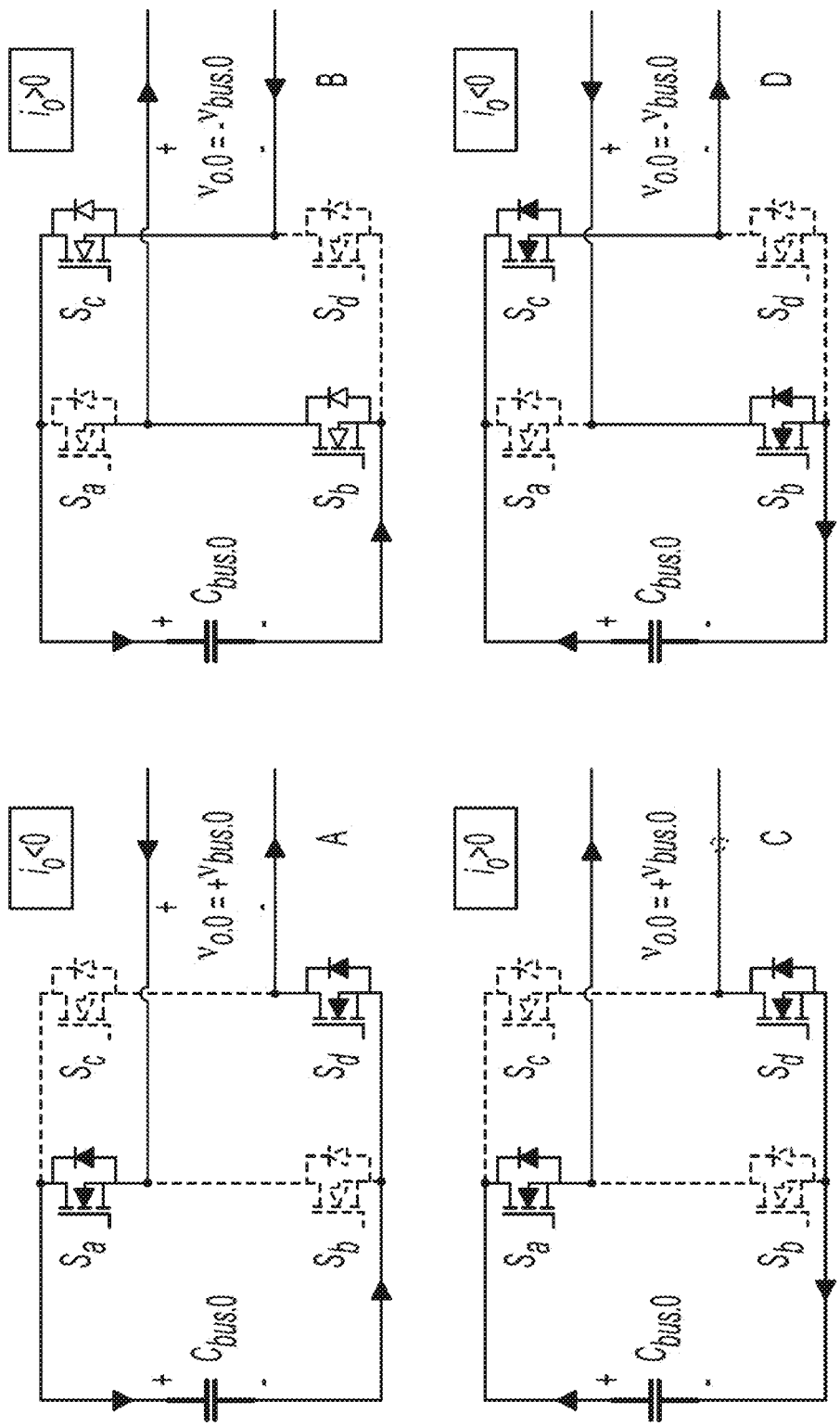
FIG. 5 shows schematics of possible circuit operations (A-D) of an H-bridge cell shown in FIG. 4 based on device switching status.

FIG. 4 shows an example H-bridge cell converter 400 that can be used as an CHB shown in FIG. 2. Each H-bridge cell module utilizes bus voltage to determine module output voltage. Depending on the switching status of switches $S_a$-$S_d$, module output can be $\pm V_{bus,i}$ and 0. As shown in FIG. 2, the configured CHB modules are connected in series at load side and inverter output voltage $v_o$ is the sum of $v_{o,0}$, $v_{o,1}$ and $v_{o,2}$. The inverter output current $i_o$ defined in FIG. 2 can flow through the $C_{bus,0}$ in both charging and discharging directions. FIG. 5 shows schematics of possible circuit operations (A-D) of an H-bridge cell shown in FIG. 4 based on switching status of switches $S_a$-$S_d$. From the figure, it can be summarized that the floating-capacitor charging occurs when the polarities of $v_{o,0}$ and $i_o$ are different and discharging occurs when they are in same polarity. For example, in operations A and B, the polarities of $v_{o,0}$ (positive in A and negative in B) and $i_o$ (negative in A and positive in B) are the different, while in operations C and D, the polarities of $v_{o,0}$ (positive in C and negative in D) and $i_o$ (positive in C and negative in D) are the same. Further, each H-bridge cell is configured to selectively provide one of: a charging the capacitor from its output terminals, discharging the capacitor to its output terminals, and providing zero voltage at its output terminals.

B. Modulation Schemes

The average floating capacitor voltage is assumed to be controlled to $1 \cdot V_{dc}$ with voltage ripples from charging and discharging. It is also assumed that the other bus voltages are $2 \cdot V_{dc}$ and $4 \cdot V_{dc}$ provided by their respective DC voltage sources such as, for example, the HFL-converters discussed above in relation to FIGS. 2 and 3. In Table I, binary-code truth table for BCMLI modulations is presented with reference to the circuit operations (A-D) shown in FIG. 5. Based on the structure in FIG. 2 and binary bus voltages, the hybrid BCMLI system can synthesize 15-level output from $-7 \cdot V_{dc}$ to $+7 \cdot V_{dc}$; it can be seen that multiple options are available for $\pm 1 \cdot V_{dc}$, $\pm 2 \cdot V_{dc}$, $\pm 3 \cdot V_{dc}$ and $\pm 5 \cdot V_{dc}$.

TABLE I

MODULATION SCHEMES OF BCMLI

| $v_o$ | $v_{o,2}$ | $v_{o,1}$ | $v_{o,0}$ | FCV | Circuit |
|---|---|---|---|---|---|
| +7 | *+4 | +2 | +1 | FC discharged | C |
| +6 | *+4 | +2 | 0 | — | |
| +5 | *+4 | +2 | −1 | FC charged | B |
| | +4 | 0 | +1 | — | |
| +4 | *+4 | 0 | 0 | — | |
| +3 | +4 | −2 | +1 | — | |
| | *+4 | 0 | −1 | FC charged | B |
| | 0 | +2 | +1 | — | |
| +2 | +4 | −2 | 0 | — | |
| | *0 | +2 | 0 | — | |
| +1 | +4 | −2 | −1 | — | |
| | *0 | +2 | −1 | FC charged | B |
| | 0 | 0 | +1 | — | |
| 0 | 0 | 0 | 0 | — | |
| −1 | 0 | 0 | −1 | — | |
| | *0 | −2 | +1 | FC charged | A |
| | −4 | +2 | +1 | — | |
| −2 | *0 | −2 | 0 | — | |
| | −4 | +2 | 0 | — | |
| −3 | 0 | −2 | −1 | — | |
| | *−4 | 0 | +1 | FC charged | A |
| | −4 | +2 | −1 | — | |
| −4 | *−4 | 0 | 0 | — | |
| −5 | −4 | 0 | −1 | — | |
| | *−4 | −2 | +1 | FC charged | A |
| −6 | *−4 | −2 | 0 | — | |
| −7 | *−4 | −2 | −1 | FC discharged | D |

Among the options for each voltage level, a set of options (indicated by "*") are selected for the hybrid BCMLI system by the following reason: To secure as many charging states of the floating capacitor as possible to make charge balanced against $\pm 7 \cdot V_{dc}$ discharging state, which draws the highest current for the longest duration. This is also the reason why $2 \cdot V_{dc}$ and $4 \cdot V_{dc}$ CHB modules cannot be the floating capacitor module. It is because they have to discharge bus capacitors during high current zone of $\pm 6$-$7 V_{dc}$ due to lack of options; released capacitor charges during those periods cannot be compensated since the current level at $\pm 1$-$5 V_{dc}$ levels are low and period durations are short. Therefore, the $1 \cdot V_{dc}$ CHB module can be a candidate for FCV control among all.

Figure 6:
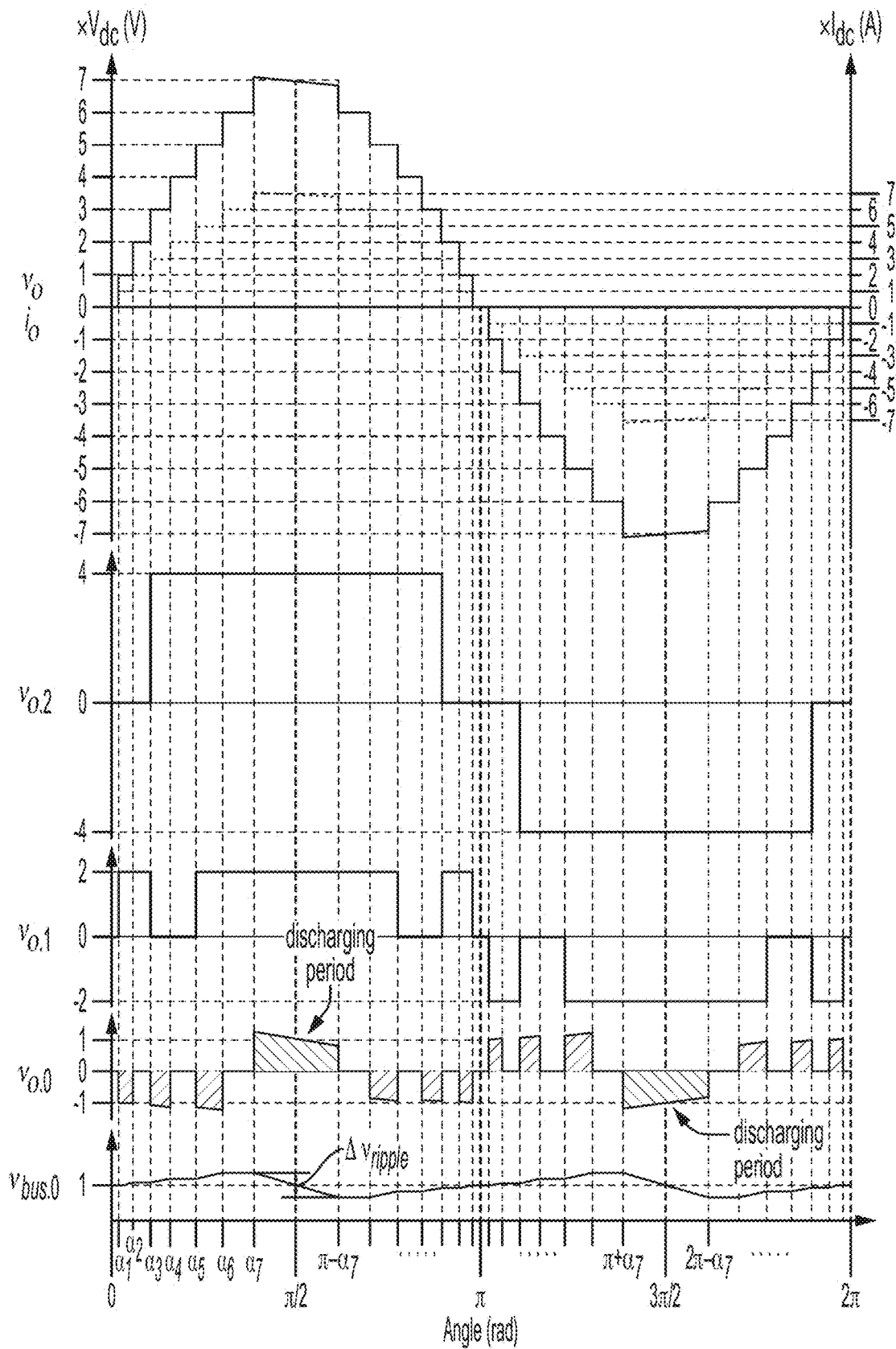
FIG. 6 shows waveforms of various voltages and currents in the example BCMLI shown in FIG. 2 for resistive loads.

From the selected schemes in Table I, the floating capacitor can be charged during $\pm 1 \cdot V_{dc}$, $\pm 3 \cdot V_{dc}$, $\pm 5 \cdot V_{dc}$ levels and discharged at peak $\pm 7 \cdot V_{dc}$ level. If the integral value of the capacitor current in those charging periods is identical to that of the discharging period, then, the capacitor, on average, will have steady-state charge-balanced operations. In other words, an average charge into at least one capacitor associated with the m H-bridge cells is substantially equal to zero over the first half-cycle and second half-cycle. FIG. 6 shows waveforms of various voltages and currents in the example BCMLI shown in FIG. 2 based on the options shown in Table 1 for resistive loads. In order to introduce entire operations of the proposed BCMLI, key waveforms of the system during one fundamental cycle are demonstrated in FIG. 6 with the detailed voltage ripples of the floating capacitor. Load is assumed to be purely resistive ($Ro = v_o/i_o$). The inverter output current $i_o$ in FIG. 6 is in phase with $v_o$ and also shows 15-level waveform with maximum level $\pm 7 \cdot V_{dc}$.

There are several approaches to determining switching angles for voltage-level transition, such as, for example and without limitation, nearest-level modulation and selective harmonics elimination methods. For the following discussion, the nearest-level method is used due to its simplicity, however, selective harmonics elimination methods can also be employed. The switching angles (also referred to as "switching instances") $\alpha_1$-$\alpha_7$ in FIG. 6 can be calculated in radians based on the assumption that three bus voltages are at constant DC values. One set of example switching angles are tabulated in Table II. All the required angles for a line cycle can be expressed by these seven angles with respect to $\pi$ based on the position in the line cycle. As can be seen from FIG. 6, the duration of floating-capacitor discharging periods (indicated by arrows) are determined by the switching angle $\alpha_7$. Thus, the discharge-amount can be adjusted by changing the value of $\alpha_7$. By changing $\alpha_7$, the voltage of floating capacitor can be increased or decreased during line cycles and even controlled to a desired reference in average. Therefore, in the proposed FCV control discussed further below, $\alpha_7$ is used as a control variable the value of which can be varied depending on the power level and the load type. The other switching angles $\alpha_1$-$\alpha_6$ can remain fixed as specified in Table II.

TABLE II

NOMINAL SWITCHING ANGLE SET BY NEAREST LEVEL MODULATION

| Angle | $\alpha_1$ | $\alpha_2$ | $\alpha_3$ | $\alpha_4$ | $\alpha_5$ | $\alpha_6$ | $\alpha_7$ |
|---|---|---|---|---|---|---|---|
| (rad) | 0.07149 | 0.21596 | 0.36521 | 0.52360 | 0.69822 | 0.90385 | 1.19055 |

C. System Design Consideration

In the hybrid BCMLI system, maximum power rating and percentages of energy transfer in each CHB module can be different. Power ratings can be computed by the maximum output current $7 \cdot I_{dc}$ period: $P_{max.0} = (1 \cdot V_{dc}) \times (7 \cdot I_{dc})$, $P_{max.1} = (2 \cdot V_{dc}) \times (7 \cdot I_{dc})$ and $P_{max.2} = (4 \cdot V_{dc}) \times (7 \cdot I_{dc})$. Thus, ratings of LLC and H-bridge in each CHB module are proportional to their bus voltages. The percentage of energy transfer by the CHB module can be also calculated from FIG. 6. Total energy through the hybrid BCMLI can be computed by (2) using waveform symmetry.

$$E = \frac{1}{2\pi} \int_0^{2\pi} v_o \cdot i_o d\theta \qquad (2)$$
$$= \frac{4}{2\pi} \int_0^{\pi/2} v_o \cdot i_o d\theta$$
$$= \frac{4}{2\pi} \sum_{j=0}^{7} (j^2 \cdot V_{dc} I_{dc}) \cdot \theta_j$$

where $\theta_j$ is the duration of $j \cdot V_{dc}$ voltage-level in radian angle which is equal to $(\alpha_{j+1} - \alpha_j)$ except $\theta_7 = \pi/2 - \alpha 7$. Similarly, energy delivery by the CHB module can be calculated as (3)

$$E_0 = \frac{4}{2\pi} \int_0^{\pi/2} v_{o.0} \cdot i_o d\theta \qquad (3)$$
$$E_1 = \frac{4}{2\pi} \int_0^{\pi/2} v_{o.1} \cdot i_o d\theta$$
$$E_2 = \frac{4}{2\pi} \int_0^{\pi/2} v_{o.2} \cdot i_o d\theta$$

By using the nominal angle set in Table II, it can be noted that $E_0/E=0\%$, $E_1/E=30.71\%$ and $E_2/E=69.29\%$. Equivalently, it means that the second CHB module 210 and the third CHB module 212 transfer energy roughly about 30% and 70% of the total energy E from input source, respectively; while the first CHB module 208 with floating capacitor only contributes to voltage-level and THD without effective energy supply.

In order to maintain low output THD, the voltage ripple of the floating capacitor should be less than a certain value and is affected by the floating capacitance $C_{bus0}$. Since the floating capacitor only discharges at $\pm 7 \cdot V_{ac}$ levels, the voltage ripple can be calculated from FIG. 6 by (4).

$$\Delta v_{ripple} = 2 \cdot \frac{7 \cdot I_{dc}}{C_{bus.0}} \cdot \Delta t_{7 \cdot Idc} = 2 \cdot \frac{7 \cdot I_{dc}}{C_{bus.0}} \cdot \frac{(\pi/2 - \alpha_7)}{2\pi \cdot f_1} \qquad (4)$$

where $f_1$ is the fundamental frequency of inverter output. From (4), maximum voltage ripple can be bounded to ($\beta$ % of $1 \cdot V_{dc}$ voltage as a design guideline for output waveform quality. Accordingly, the minimum boundary of required floating capacitance can be derived as follows.

$$C_{bus.0} \geq \frac{2(7 \cdot I_{dc})}{\Delta v_{ripple.max}} \cdot \frac{(\pi/2 - \alpha_7)}{2\pi \cdot f_1} = \frac{2(7 \cdot I_{dc})}{\beta\% \cdot V_{dc}} \cdot \frac{(\pi/2 - \alpha_7)}{2\pi \cdot f_1} \square \qquad (5)$$

D. Reactive Power Capability

Figure 7:
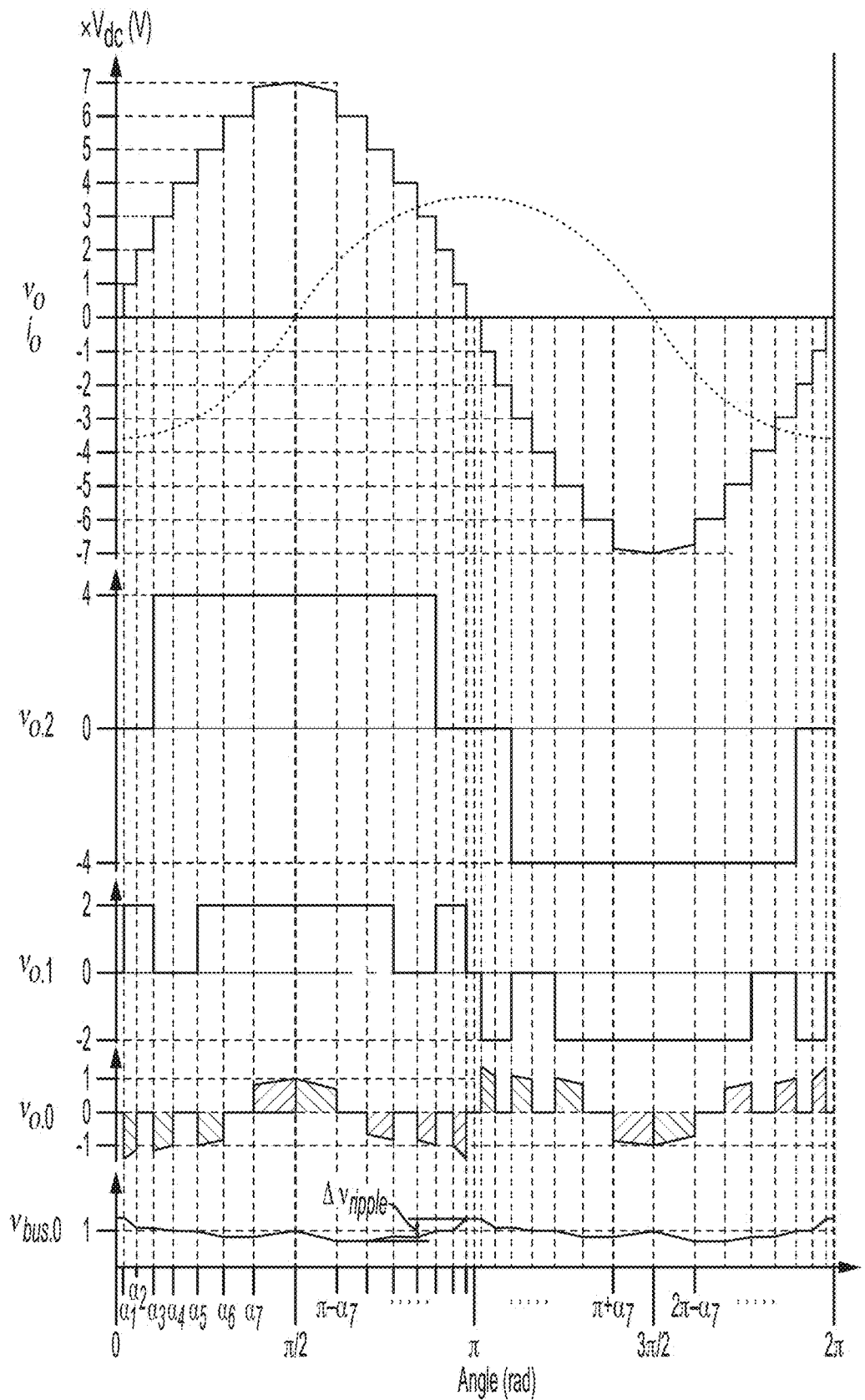
FIG. 7 shows waveforms of various voltages and currents in the example BCMLI shown in FIG. 2 for inductive loads.

As an inverter, the hybrid BCMLI should be able to supply to not only resistive, but also reactive loads. Therefore, various applications such as grid-tied inverter, static VAR generation, and certain motor drives can adopt the proposed circuit. FIG. 7 shows waveforms of various voltages and currents in the example BCMLI shown in FIG. 2 for inductive loads. All the modulation schemes at individual voltage levels remained unchanged; switching angles $\alpha_1$-$\alpha_6$ are still fixed as Table II and $\alpha_7$ is used as the control variable. By the proposed scheme, the varying range of $\alpha_7$ for inductive supply changes from resistive case. The tendencies of charging/discharging periods and FCV waveforms also change. The variable $\alpha_7$ is involved in charging at $[\alpha_7, \pi/2]$ and discharging at $[\pi/2, \pi-\alpha_7]$. As a result, the voltage of floating capacitor can be regulated at the desired level in an average manner by obtaining charge-balance during line cycles.

III. PROPOSED FCV CONTROL

As mentioned in Section II, the amount of charging and discharging in $C_{bus.0}$ can be balanced by an adjustable switching angle $\alpha_7$. However, this balanced charge by time-domain current accumulation may not guarantee that the average value of $V_{bus.0}$ will be at $1 \cdot V_{dc}$. Therefore, a feedback FCV control with the control variable $\alpha_7$ can be employed. The control design process is based, in part, on the assumption that load is resistive in FIG. 6. Analysis, design and simulation results are also discussed below.

A. Small-Signal Analysis

For the sake of designing a feedback control, analysis of dynamic responses related to system variables can be considered. According to FIG. 6, the floating capacitor $C_{bus.0}$ experiences non-zero current operation when output voltage-level is at $\pm 1 \cdot V_{dc}$, $\pm 3 \cdot V_{dc}$, $\pm 5 \cdot V_{dc}$ and $\pm 7 \cdot V_{dc}$.

TABLE III

STATE-SPACE EQUATIONS OF THE FLOATING CAPACITOR VOLTAGE

| $v_0$ | Duration(s) | State-space equation |
|---|---|---|
| $+1 \cdot V_{dc}$ | $t_1 = (\alpha_2 - \alpha_1)/2\pi f_1$ | $\dfrac{dv_{bus.0}}{dt} = +\dfrac{1 \cdot I_{dc}}{C_{bus.0}} = +\dfrac{1 \cdot V_{dc}}{R_o C_{bus.0}}$ |
| $+3 \cdot V_{dc}$ | $t_3 = (\alpha_4 - \alpha_3)/2\pi f_1$ | $\dfrac{dv_{bus.0}}{dt} = +\dfrac{3 \cdot I_{dc}}{C_{bus.0}} = +\dfrac{3 \cdot V_{dc}}{R_o C_{bus.0}}$ |
| $+5 \cdot V_{dc}$ | $t_5 = (\alpha_6 - \alpha_5)/2\pi f_1$ | $\dfrac{dv_{bus.0}}{dt} = +\dfrac{5 \cdot I_{dc}}{C_{bus.0}} = +\dfrac{5 \cdot V_{dc}}{R_o C_{bus.0}}$ |
| $+7 \cdot V_{dc}$ | $t_7 = (\pi/2 - \alpha_7)/2\pi f_1$ | $\dfrac{dv_{bus.0}}{dt} = -\dfrac{7 \cdot I_{dc}}{C_{bus.0}} = -\dfrac{7 \cdot V_{dc}}{R_o C_{bus.0}}$ |

In Table III, the state-space equations of the capacitor are summarized with durations in positive half cycle. The FCV, $V_{bus.0}$ can be defined as the state-space variable. Based on those equations, state-space averaging can be conducted as (6).

$$\frac{dv_{bus.0}}{dt} = \frac{4}{T_1} \int_0^{T_1/4} \frac{i_C}{C_{bus.0}} \cdot \Delta t \qquad (6)$$

$$= \frac{4}{T_1} \sum_{k=1,3,5,7} \frac{i_C}{C_{bus.0}} \cdot t_k$$

$$= \frac{4}{2\pi} \cdot \frac{V_{dc}}{R_o C_{bus.0}} \left\{ \begin{array}{l} (\alpha_2 - \alpha_1) + 3(\alpha_4 - \alpha_3) + \\ 5(\alpha_6 - \alpha_5) - 7(\pi/2 - \alpha_7) \end{array} \right\}$$

where $T_1$ is the period of fundamental frequency $f_1$. After that, the averaged equation (6) can be perturbed to get small-signal dynamics at average operation point. Differential component can be expressed with frequency s-operator. Assuming that all the perturbed variables, except $V_{bus.0}$ and $\alpha_7$, are zero, the transfer function $G_{v\alpha}(s)$ between the two variables can be formulated as (7).

$$G_{v\alpha}(s) = \frac{\hat{v}_{bus.0}}{\hat{\alpha}_7} = \frac{1}{s} \cdot \frac{2}{\pi} \cdot \frac{7 \cdot V_{dc}}{R_o C_{bus.0}} \qquad (7)$$

Figure 8:
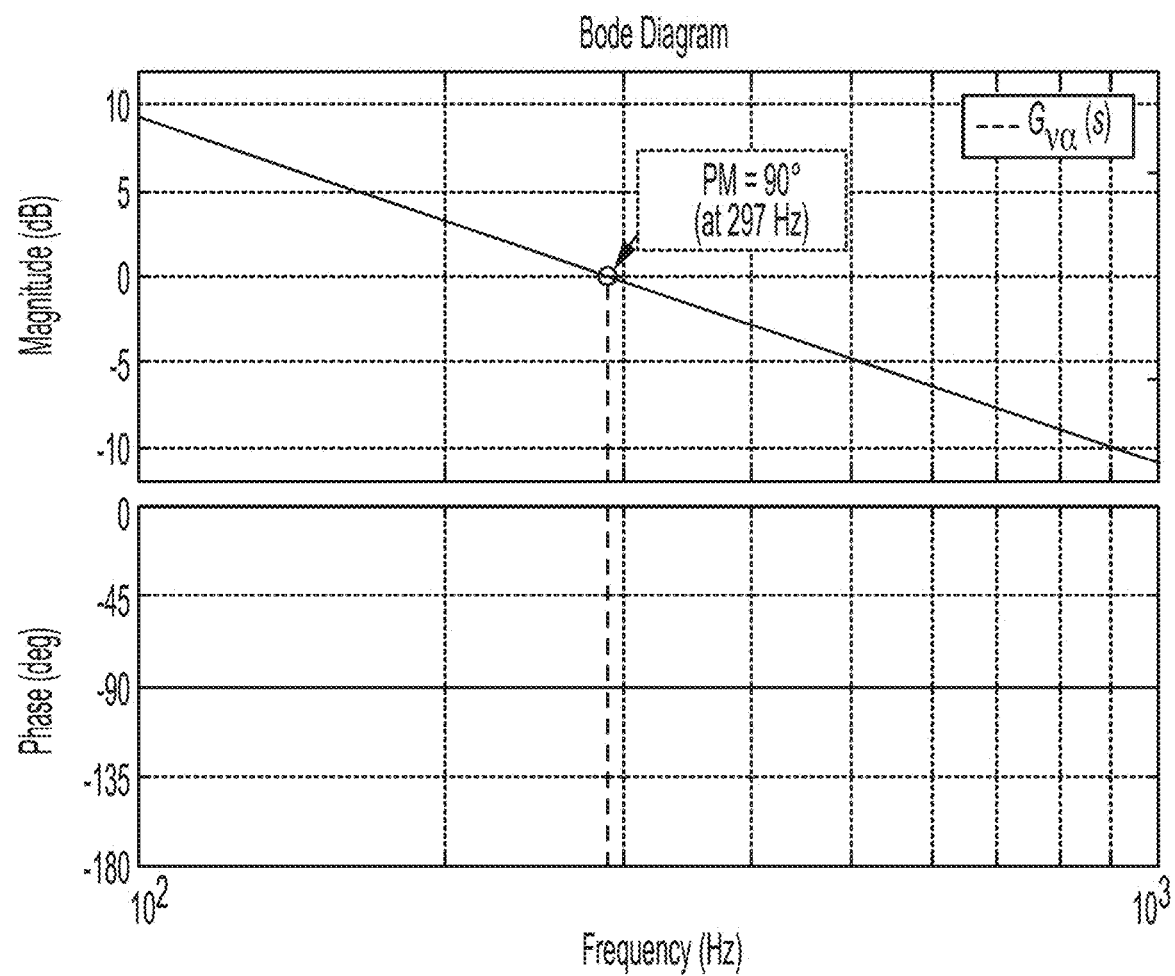
FIG. 8 shows example magnitude and phase plots related to floating capacitor voltage control.

Since (7) includes an integrator and no other pole/zero, its phase in the frequency domain is 90 degree. FIG. 8 shows example magnitude and phase plots $G_{v\alpha}(s)$ with specifications of $V_{dc}=100$ V ($v_{o.pk}=700$ V), $P_o=1$ kW, and $C_{bus.0}=1.8$ mF. The values shown in FIG. 8 are only example values for a particular specification, and that other specification values can lead to different magnitude and phase values.

B. Control Design and Implementation

Figure 9:
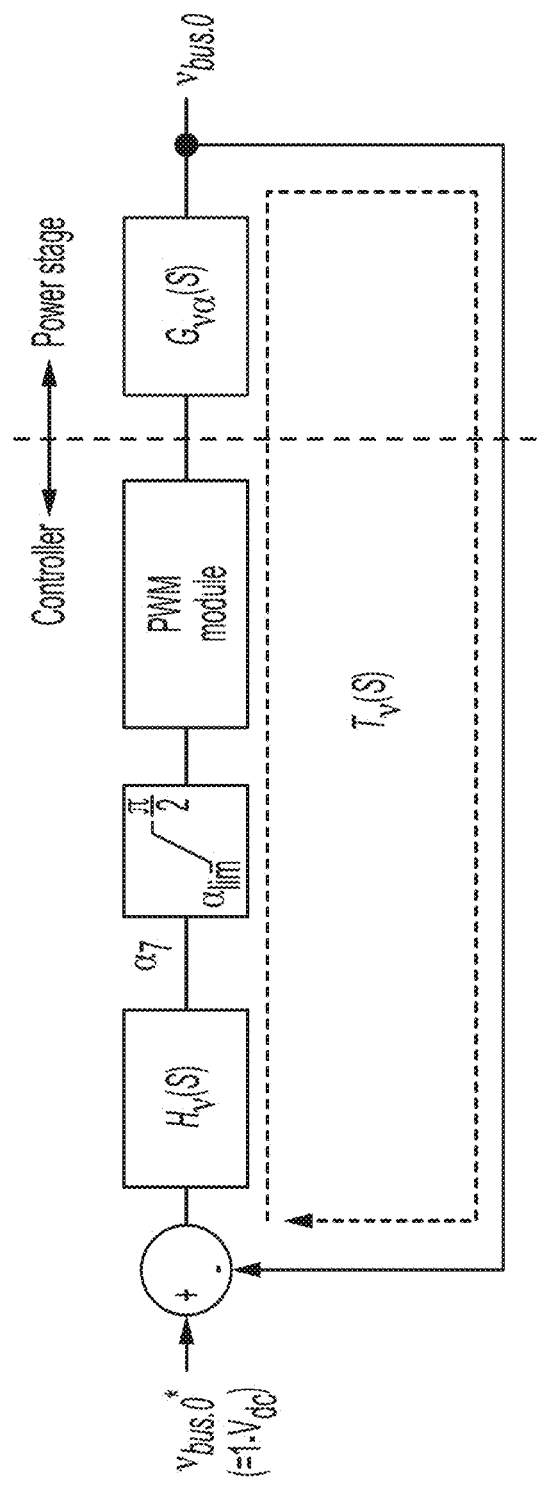
FIG. 9 shows a block diagram of an example floating capacitor voltage (FCV) control system.

With the derived transfer function $G_{v\alpha}(s)$, a closed control-loop $T_v(s)$ can be designed in the form of (8).

$$T_v(s) = H_v(s) \cdot G_{v\alpha}(s) \cdot FM \qquad (8)$$

where $H_v(s)$ is the transfer function of compensator, and FM is the pulse-width-modulation (PWM) modulation gain. FIG. 9 shows a block diagram of an example FCV control. Since FM is generally a numerical coefficient, the control-loop $T_v(s)$ can be in the same form as that in equation (7) if the compensator $H_v(s)$ is designed as proportional (P) gain. Then, the phase margin throughout frequency range is 90 degrees and the risk of instability of the closed-loop FCV control can be lowered. Moreover, even with proportional-integral (PI) compensator, the phase effects of additional integral and a zero can be cancelled properly to obtain high margin at the cross-over frequency. Therefore, the described FCV control can be considered as being stable. From the physical circuit point of view in FIG. 5, the floating capacitor with the described control can be considered as a bi-directional current source connected to load in series, confirming the stability of proposed FCV control.

For the experimental verifications, the proposed FCV control discussed herein can be implement a PI compensator to remove steady-state errors in the $1 \cdot V_{dc}$ voltage. Because the fundamental frequency of inverter output is relatively low (e.g., about 60 Hz or the fundamental frequency of the output voltage), the dynamic of the proposed control doesn't need fast control bandwidth. The designed $H_v(s)$ is formulated in (9) and the PI gains are set to $K_p=0.01$ and $K_i=0.05$, respectively. The designed gains are implemented not only for frequency analysis, but also for experimental verifications in Section V.

$$H_v(s) = K_p + \frac{K_i}{s} \qquad (9)$$

Figure 10:
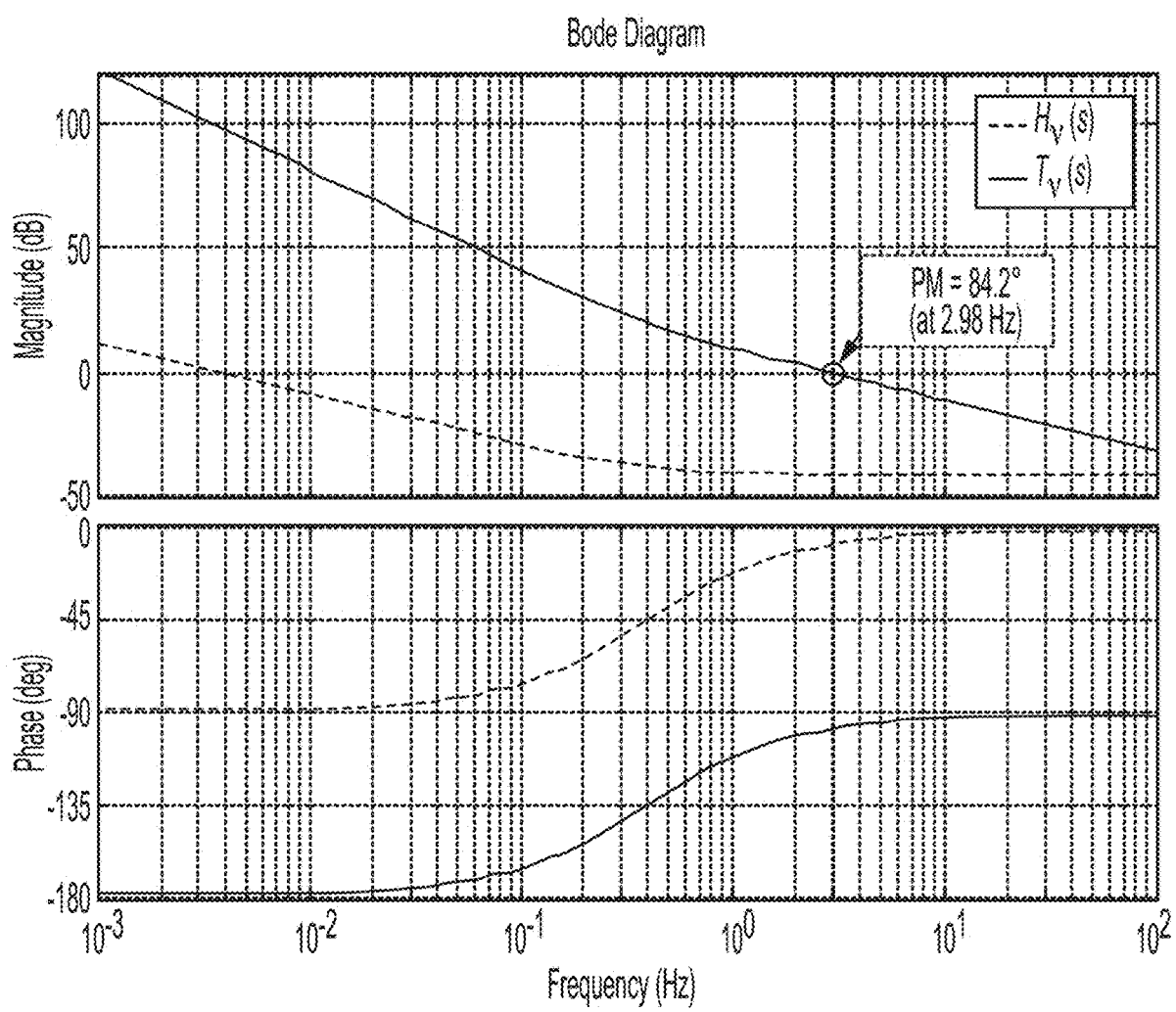
FIG. 10 shows example magnitude and phase plots related to the compensator $H_v(s)$ and loop gain $T_v(s)$ shown in FIG. 9.

FIG. 10 shows example magnitude and phase plots related to the compensator $H_v(s)$ shown in FIG. 9. In particular, in FIG. 10, the designed PI compensator $H_v(s)$ and closed-loop gain $T_v(s)$ are plotted together with identical specifications to those used in FIG. 8. The cross-over frequency of $T_v(s)$ is located near 3 Hz with sufficient phase margin. The values shown in FIG. 10 are only example values for a particular specification, and that other specification values can lead to different magnitude and phase values.

Figure 11:
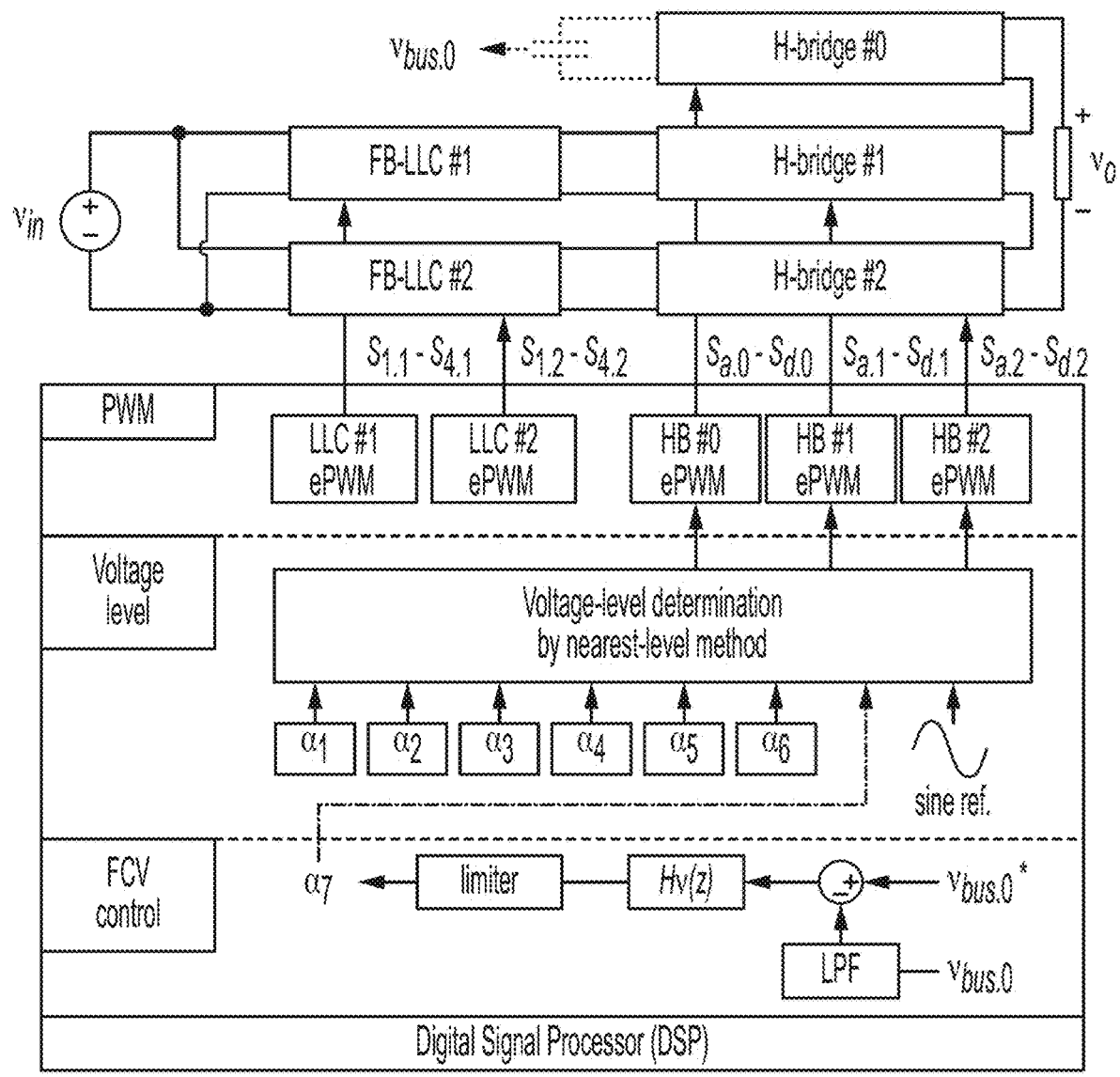
FIG. 11 shows a block diagram of an example controller for controlling the operation of a BCMLI shown in FIG. 2.

FIG. 11 shows a block diagram of an example controller for controlling the operation of a BCMLI shown in FIG. 2. In particular, in FIG. 11, the block diagram of the control system is described considering real implementation with digital signal processor (DSP). However, in some implementations, controllers other than digital signal processors can also be used. The controller includes: an FCV control, a voltage-level selection by nearest-level method and PWM modules. The angle $\alpha_7$ is obtained from the compensator $H_v(s)$ and is directly used to determine the real-time transitions between $\pm 6 \cdot V_{dc}$ and $\pm 7 \cdot V_{dc}$. For the other angles $\alpha_1$-$\alpha_6$, the calculated values in Table II can be used. Then, the CHB modulation signals are provided by the selected options in Table I to the three-CHB PWM modules.

C. System Capability

Figure 12:
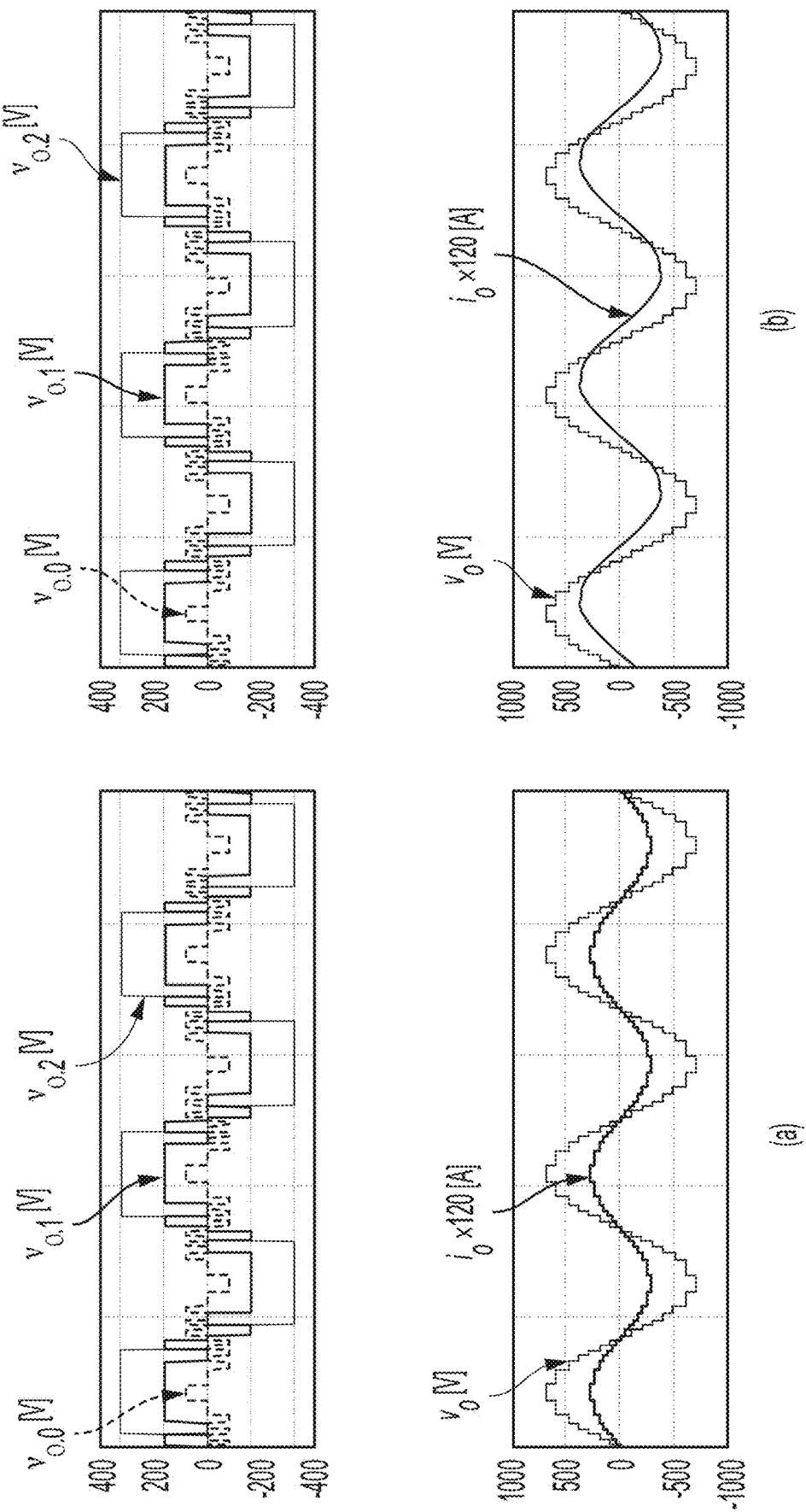
FIG. 12 shows example simulation results of the hybrid BCMLI with FCV control with wide range of RL-loads and power factors.

The hybrid BCMLI with the FCV control can implement certain system capabilities. First, as an inverter, the system can deal with both active and reactive loads for possible applications such as certain motor drives, and static VAR generator, and grid-tied inverters. FIG. 12 shows example simulation results of the hybrid BCMLI with FCV control with wide range of RL-loads and power factors. The specifications are: $v_{in}=150$ V (dc-source), $V_{dc}=100$ V ($V_{bus.0}=100$ V, $V_{bus.1}=200$ V, $V_{bus.2}=400$ V), $C_{bus.0}=1.8$ mF, $v_o=495$ Vrms (700 $V_{pk}$), $P_o=1$-1.1 kVA and modulation index (M.I.)=1. It should be noted the above specifications are only example values, and are non-limiting. Various other implementations may utilize various other specification values. Detailed RL-load values are organized in Table IV. As can be seen from FIG. 12, the BCMLI system can supply both R/RL-load types with well-regulated floating capacitor voltages $V_{bus.0}$ at 100 V. The average floating capacitor voltage of 100 V has been selected as an example, and that any predetermined average value, other than 100 V may also be selected. The waveforms of R-load in FIG. 12(a) and L-load in FIG. 12(d) show good agreement with the key waveforms in FIG. 6 and FIG. 7, respectively. It can be noted that even near purely reactive supply condition, the control variable $\alpha_7$ keeps changing by the FCV controller and is able to regulate $V_{bus.0}$ at desired value in average.

Figure 13:
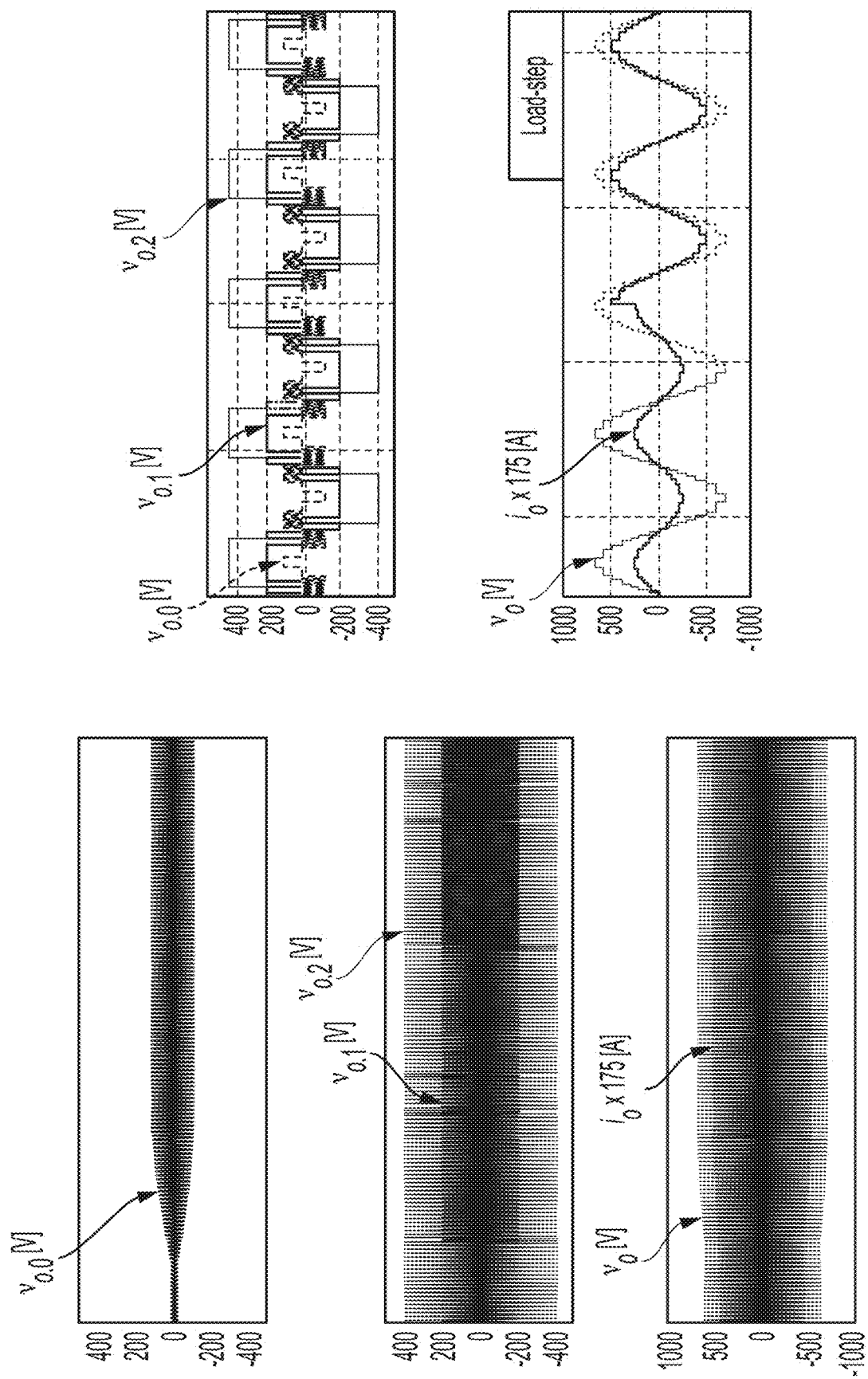
FIG. 13 shows example simulation results of transient performance of the hybrid BCMLI with FCV control.

In addition to steady-state operations, transient situations such as start-up, load-step, voltage-step and frequency-step with voltage change can be accommodated by the BCMLI. FIG. 13 shows example simulation results of transient performance of the hybrid BCMLI with FCV control. In particular, in FIG. 13, transient simulation results of start-up and load-step are illustrated first. With the designed PI compensator in the previous subsection, the voltage $V_{bus.0}$ of floating capacitor starts up from 0 V to 100 V with slow but stable dynamics. In simulation, the limiter of $\alpha_7$ after compensator is set with lower limit of $\sin^{-1}(6/7)=1.029$ (rad) and upper limit of $\pi/2=1.5707$ (rad); for that reason, $\alpha_7$ goes up from the low limit, stays saturated for a certain duration at the top limit, and then enters steady-state region with a smooth transient. For the load-step case in FIG. 13, output resistive load increases from 500 W (50%) to 1 kW (100%) at peak output condition (t=2.99 s); the proposed FCV control responds well with timely changing $\alpha_7$. As a result, the average voltage still remains at about 100 V and the voltage ripple becomes twice by doubled discharging current.

Figure 14:
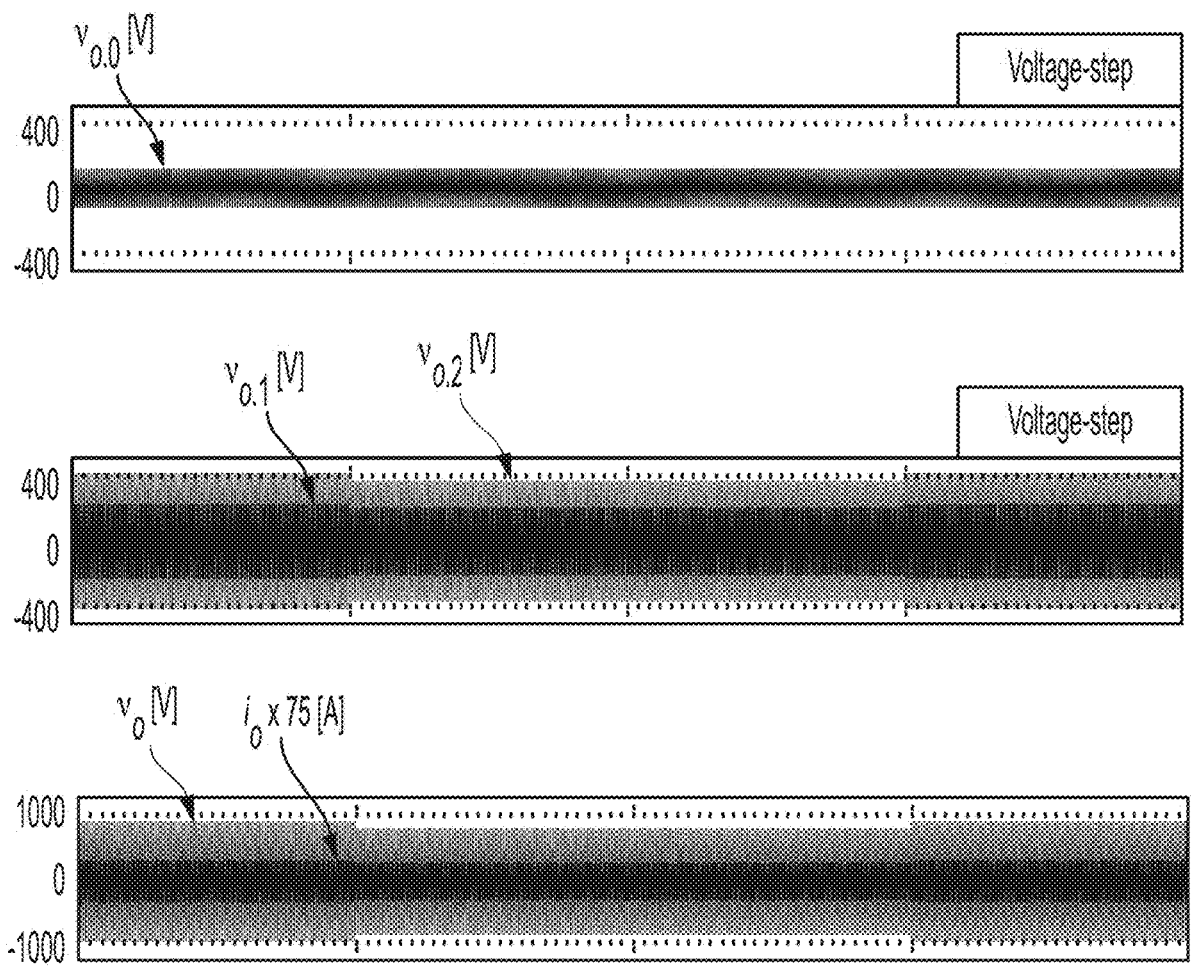
FIG. 14 shows example simulation results of response to voltage step and frequency step of the hybrid BCMLI with FCV control.

FIG. 14 shows example simulation results of response to voltage step and frequency step of the hybrid BCMLI with FCV control. Control capabilities and proper responses under voltage-steps and frequency-steps are desired for most inverters; it is mainly because those situations are ordinary conditions that can happen frequently in those applications. For example, grid-tied inverter system may desire active/reactive operations for 1-1.5 sec with low-voltage ride through under fault conditions. For some motor drive applications such as the air conditioning system, continuing operation is also desired during a short voltage interruption or voltage sag period. As can be seen from FIG. 14, the hybrid BCMLI can respond to transitions smoothly with the proposed FCV control. The simulation conditions contain voltage-steps between 80% to 100% modulation indexes and halved/doubled frequency-steps.

IV. COMPARATIVE ASSESSMENT

Comparative analysis of the BCMLI topology with FCV control with state-of-the-art topologies has been conducted. For fair assessment, comparison target has been narrowed to single-phase CHB-based asymmetric cascaded multilevel inverters with a single dc-source and three CHB modules.

As mentioned above, some example trinary inverters adopt boost converter with charge-pumps and dual-half-bridge as front-end HFL-converters. The one with charge-pumps can regulate three bus-voltages by HFL-converters so that no floating capacitor exists, but its $1 \cdot V_{dc}$ and $3 \cdot V_{dc}$ bus voltages rely on passive flow by charge pumps so that regulation flexibility could be an issue. Some other trinary inverters have dual-half-bridge between $1 \cdot V_{dc}$ and $3 \cdot V_{dc}$ capacitors which regulates both voltages by bi-directional power flow and connects a main dc-source directly to $9 \cdot V_{dc}$ bus. In terms of component counts, both trinary inverters have fewer numbers in HFL-converters than the hybrid BCMLI discussed herein. On the other hand, the asymmetric inverter in some other implementations utilizes only CHB-stages without HFL-converters so that the topology has the simplest system structure of all.

From the output quality point of view, some trinary inverters can produce 27-level output voltage with the lowest THD near 3%. Some inverters show the fewest 9 output levels since their FCV control regulates the two floating capacitor voltages to symmetric value. Compared to them, the BCMLI discussed herein shows in-between output quality with 15-level voltage.

TABLE V

QUANTITATIVE COMPARISON WITH SINGLE DC-SOURCE ASYMMETRICAL CASCADED MULTILEVEL INVERTERS

| | | | | | | | | | | | System Characteristics | | | |
|---|---|---|---|---|---|---|---|---|---|---|---|---|---|---|
| | Asymmetric | HFL-converters | | | | | CHB stages | | | | | | | Control |
| Ref. | source ratio | $N_{module}$ | $N_{switch}$ | $N_{diode}$ | $N_{trans.}$ | $N_{cap.}$ | $N_{switch}$ | $N_{float.cap.}$ | $v_{o.level}$ | $M_{gain}$ | | Isolation | Reactive | complexity |
| [13] | 1:3:9 | 3 | 1 | 5 | 1 | 6 | 12 | 0 | 27 | $M_{boost} \times 1.44$ | | No | L-filter | Mid |
| [14] | 1:3:9 | 2 | 4 | 0 | 1 | 4 | 12 | 2 | 27 | 1.228 | | No | Unverified | High |
| [17] | 1:0.38:0.38 | 0 | 0 | 0 | 0 | 0 | 12 | 2 | 9 | 1.76 | | No | Pure L | Highest |
| BCMLI | 1:2:4 | 2 | 8 | 4 | 2 | 6 | 12 | 1 | 15 | $M_{mod.2} \times 1.75$ | | Yes | Pure L | Lowest |

In the last four columns of Table V, several system characteristics are compared. First, voltage gain $M_{gain}$ is defined as $v_{o.pk}/v_{in}$ to evaluate voltage step-up capability. In [13], the boost converter raises $V_{in}$ to $9 \cdot V_{dc}$ and the output peak is $13 \cdot V_{dc}$; then, $M_{gain}$ can be calculated by multiplication of $M_{boost}$ and 13/9. In [14], a dc-source is used as $9 \cdot V_{dc}$ bus and modulation-index limit (0.85) exists so that $M_{gain}$ is $13/9 \times 0.85$. The asymmetric inverter in [17] can synthesize output voltage up to 1.76 (=1+0.38+0.38) which is maximum $M_{gain}$. The hybrid BCMLI discussed herein can, in some implementations, have a gain $M_{mod.2}$ between $V_{in}$ and $4 \cdot V_{dc}$ bus with the transformer design and secondary voltage doubler in FIG. 3 ($M_{mod.2}=2 \times \eta_{trans.2}$). Since the output peak of BCMLI is $7 \cdot V_{dc}$, the $M_{gain}$ can be expressed by $M_{mod.2} \times 7/4$, which shows that the BCMLI has the highest relative voltage gain.

Besides the relatively higher gain, the BCMLI system discussed herein is the only topology that can provide thorough galvanic isolation between input and output, which is desirable for high voltage, high power inverter applications.

In aspect of reactive power capability, the trinary inverter in [13] operates with a small L-filter of which power factor is close to resistive-load case; the one in [14] has no RL load verification, while the asymmetric inverter in [17] and the BCMLI discussed herein are proven to have reactive power capability up to near purely inductive load.

Lastly, the hybrid BCMLI discussed herein uses a relatively simpler control structure with the FCV control in a single-loop. On the other hand, the trinary inverters in [13][14] utilize dual-loop PI control and dual-loop PI control plus dual-half-bridge regulation, respectively. Additional signal jumping scheme is necessary in [13] for regenerative power suppression and the control in [14] has limits of modulation index and power. Among all, the control algorithm in [17] has the highest complexity; it also has non-reachable region, instability issue and corresponding voltage-ratio limits.

From the review of the state-of-the-art topologies in [13], [14], [17] and the BCMLI discussed herein, it can be noted that the advantages such as, high voltage-gain design, input-output galvanic isolation, pure reactive-power supply and stability without losing modulation index are obtainable at the same time. Low control complexity is another advantage of the BCMLI discussed herein.

Based on relative advantages of the hybrid BCMLI, the topology is well suited for high-voltage inverter (grid-tied/standalone) and drive applications in terms of load types; it is also suitable for high-power distributed source applications (e.g. PV farm, UPS) in aspect of source types.

Figure 15:
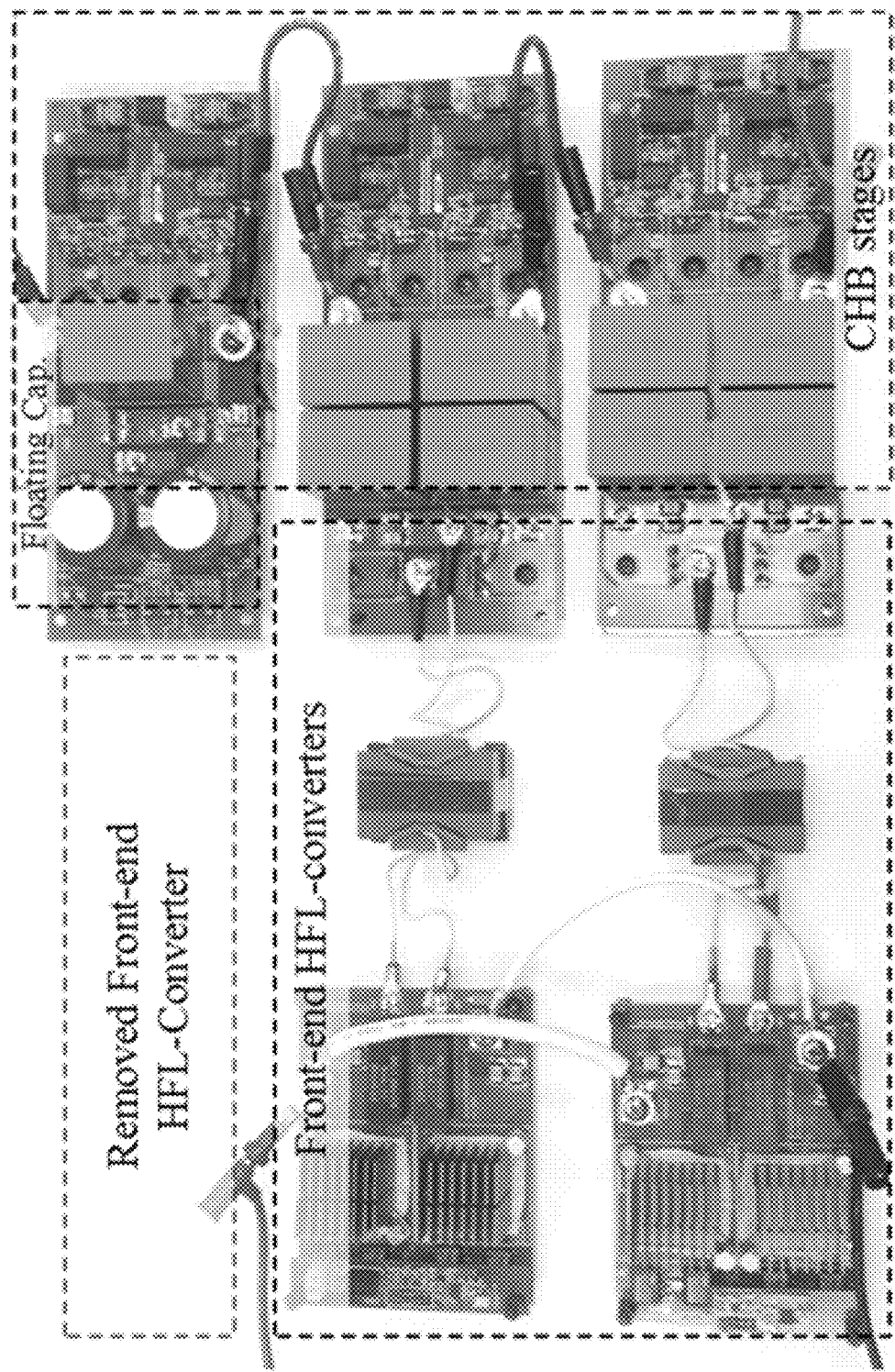
FIG. 15 shows a photograph of an example prototype of the single-source hybrid BCMLI system with FCV control shown in FIG. 2.

In order to verify feasibility of the single-source hybrid BCMLI system and effectiveness of the proposed FCV control, a laboratory-scale prototype has been built as shown in FIG. 15. As can be seen, one third of front-end HFL converters are removed (as compared to the structure discussed above in relation to FIG. 1B) as indicated by the top-left dotted box and three back-end CHB-stages synthesize the 15-level output waveform from the bus voltages in binary ratios. Due to the reduction by the proposed FCV control, the power density has been increased by 25%. Target ratings are 495 $V_{rms}$ (700 $V_{pk}$) output voltage and 1-kW power level from a 160-V single dc-source. The details of the experimental specifications are summarized in Table VI. The converter voltage gain $M_{mod.2}$ between $v_{in}$ and $V_{bus.2}$ is designed to 2.5 and the system voltage gain $M_{gain}$ ($=v_{o.pk}/v_{in}$) is 4.375.

TABLE VI

PARAMETERS OF EXPERIMENTAL SETUP

| System specifications | | | |
|---|---|---|---|
| $v_{in}$ | 160 V | $P_o$ | 1 kW (100%) |
| $v_{bus.0}$ | 100 V (=$V_{dc}$) | $C_{bus.0}$ | 1.8 mF |
| $v_{bus.1}$ | 200 V | $f_1$ | 60 Hz |
| $v_{bus.2}$ | 400 V | $f_{samp.}$ | 20 kHz |
| $v_o$ | 495 $V_{rms}$ (700 $V_{pk}$) | DSP | TMS320F28377D |
| HFL-converters (FIG. 3) | | | |
| $L_{r.1}$, $C_{r.1}$ | 2.2 μH, 11.0 nF | Switches | GS66516T |
| $L_{r.2}$, $C_{r.2}$ | 1.7 μH, 13.5 nF | Diodes | SCS210KE2 |
| $f_{r.1}$ | 1.02 MHz | $n_{trans.1}$ | 6/10 |
| $f_{r.2}$ | 1.05 MHz | $n_{trans.2}$ | 11/9 |
| $f_{sw.LLC}$ | 1 MHz | $C_b$ | 0.33 μF |
| CHB stages (FIG. 4) | | | |
| $C_{bus.1/2}$ | 2.2 mF | Switches | C3M0075120 |

Figure 16:
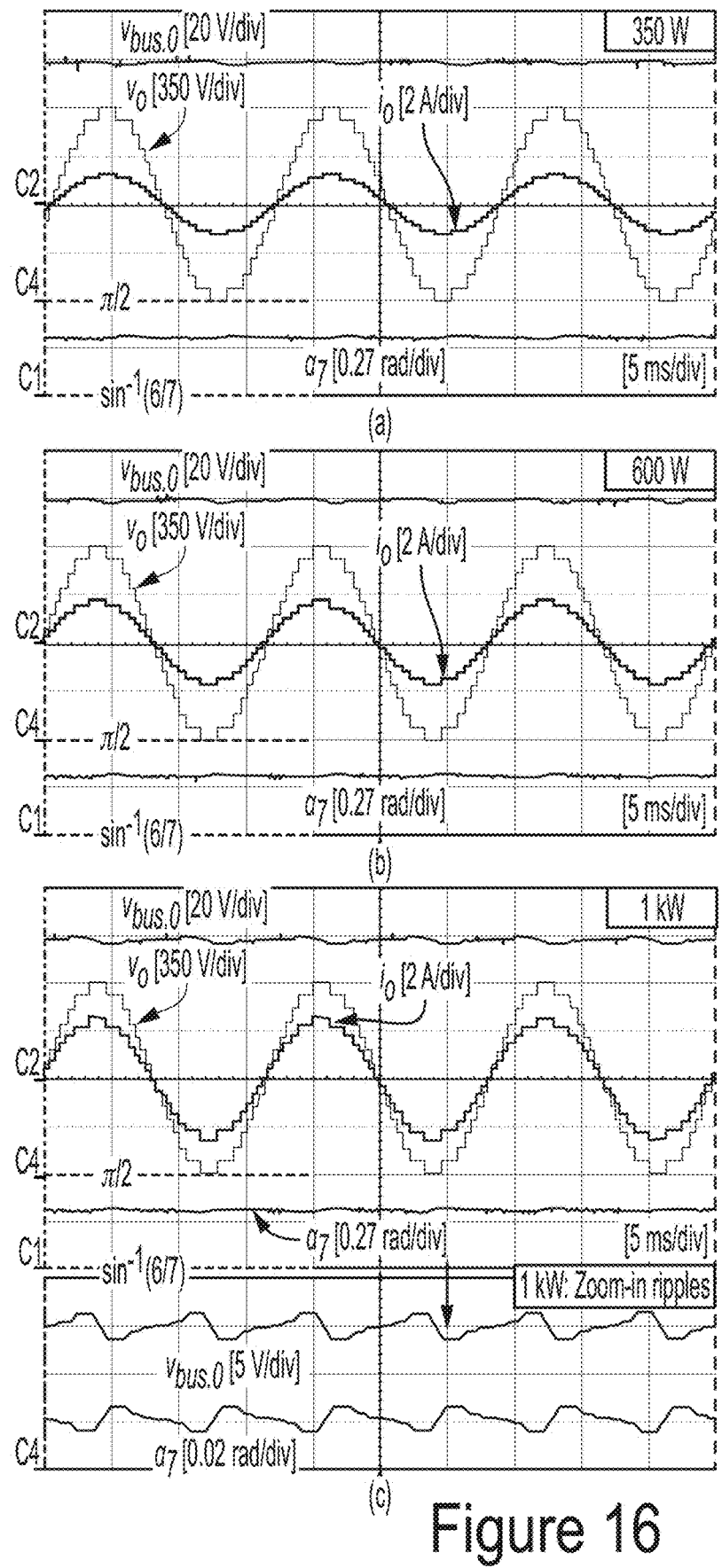
FIG. 16 shows steady-state waveforms of the hybrid BCMLI system of FIG. 15 with different power levels.

FIG. 16 shows steady-state waveforms of the hybrid BCMLI system with different power levels. Here, purely resistive loads have been used first. As can be seen, regardless of the power level, the proposed FCV control achieves 100 V bus voltage and charge-balance of the floating capacitor by adjusting the switching angle $\alpha_7$. As analyzed previously, discharging periods can occur at the highest voltage level; the tendency can be found from the 1-kW zoom-in ripple waveform in FIG. 16. With 1-kW load, the steady-state voltage ripple is about 2.4 V, showing matched results to simulation.

Figure 17:
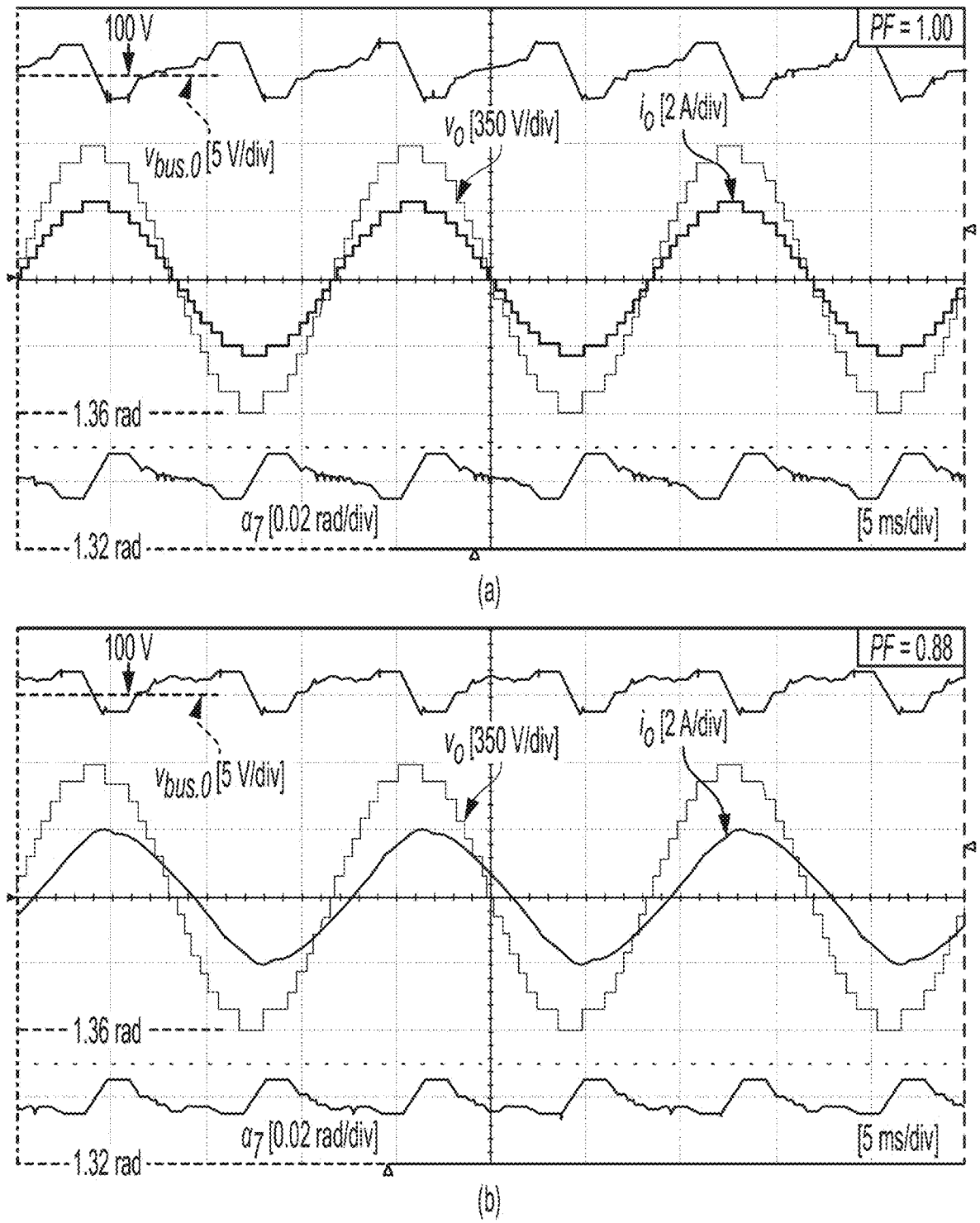
FIG. 17 shows waveforms of voltages and currents for different power factor operations tested with RL load variations.
Figure 18:
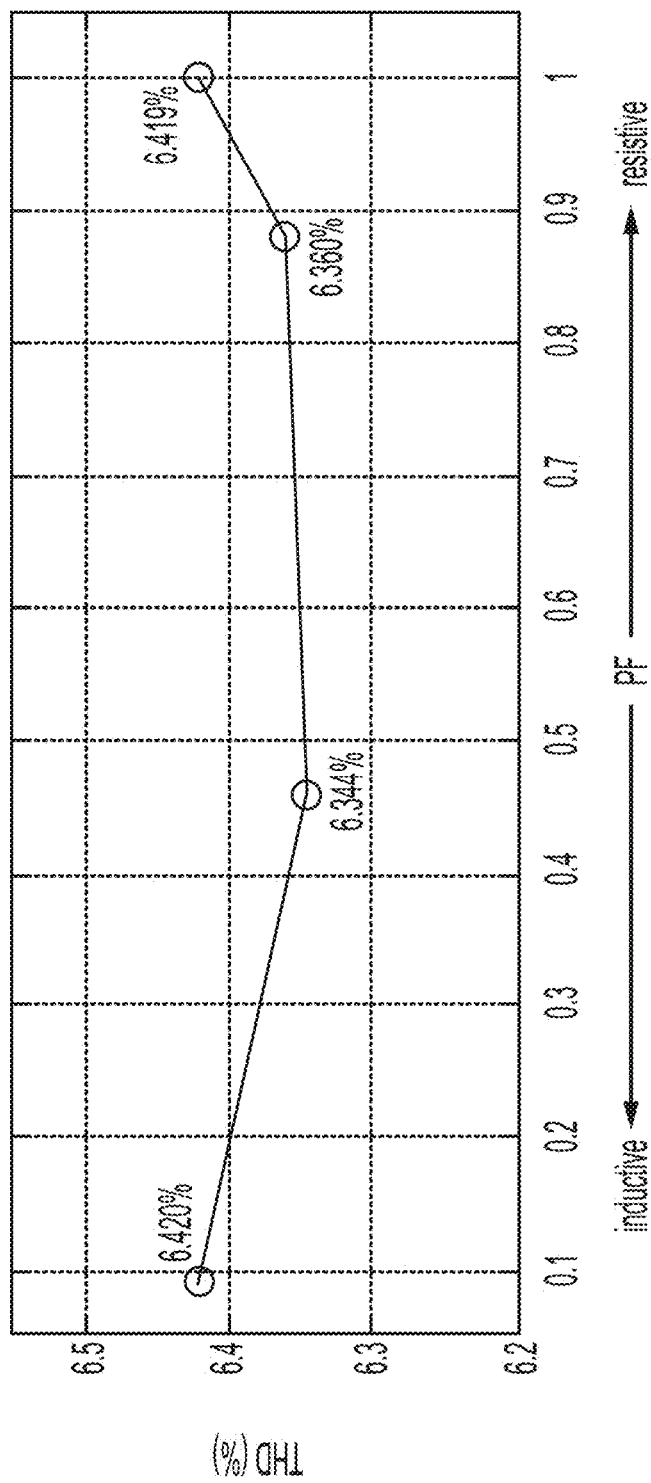
FIG. 18 shows a graph depicting low output voltage distortions for different power factor operations or load types.

In FIG. 17, a set of different power-factor operations are tested with RL-load variations. The load specifications are identical to FIG. 12 from Table IV. It can be noted that the proposed FCV control can perform 100-V regulations under both active and reactive power supplying conditions. The voltage variations of floating capacitor $V_{bus.0}$ shows good agreement with the tendencies described in FIG. 6 and FIG. 7. All waveforms appear to be well-matched to the simulation results in FIG. 12. Moreover, the influence of adjustable $\alpha_7$ can be found from FIG. 17 due to the fact that the value of $\alpha_7$ decreases and the $\pm 7 \cdot V_{dc}$ periods become adjusted as load gets more resistive or inductive, which shows effectiveness of the proposed FCV control. In addition, the measured THD curve by PF in FIG. 18 shows that the output voltage distortion remains almost similar level by the proposed FCV control regardless of load type and corresponding power factor variations; the measured results also show good agreements with simulated THD in Table IV.

Figure 19A:
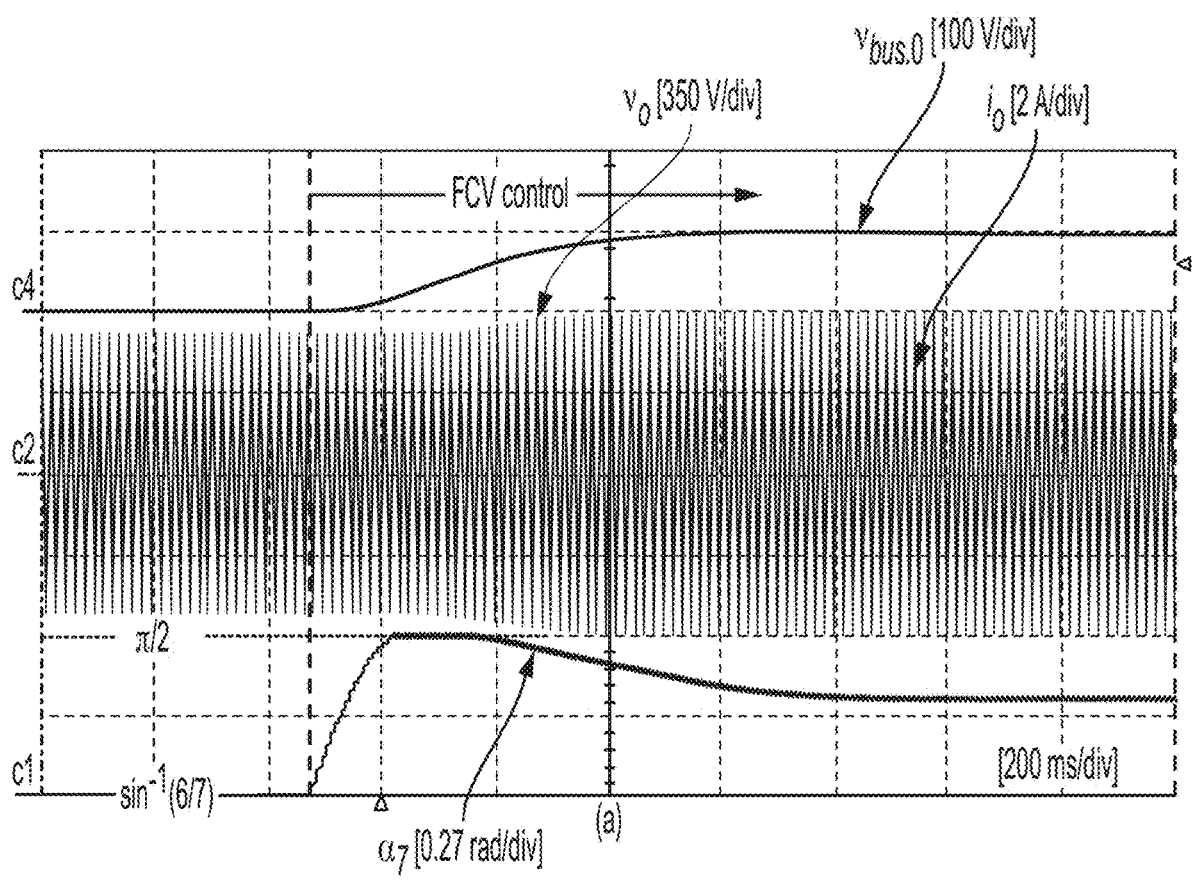
FIGS. 19A-19C show example transient waveforms of the hybrid BCMLI system of FIG. 15.
Figure 19B:
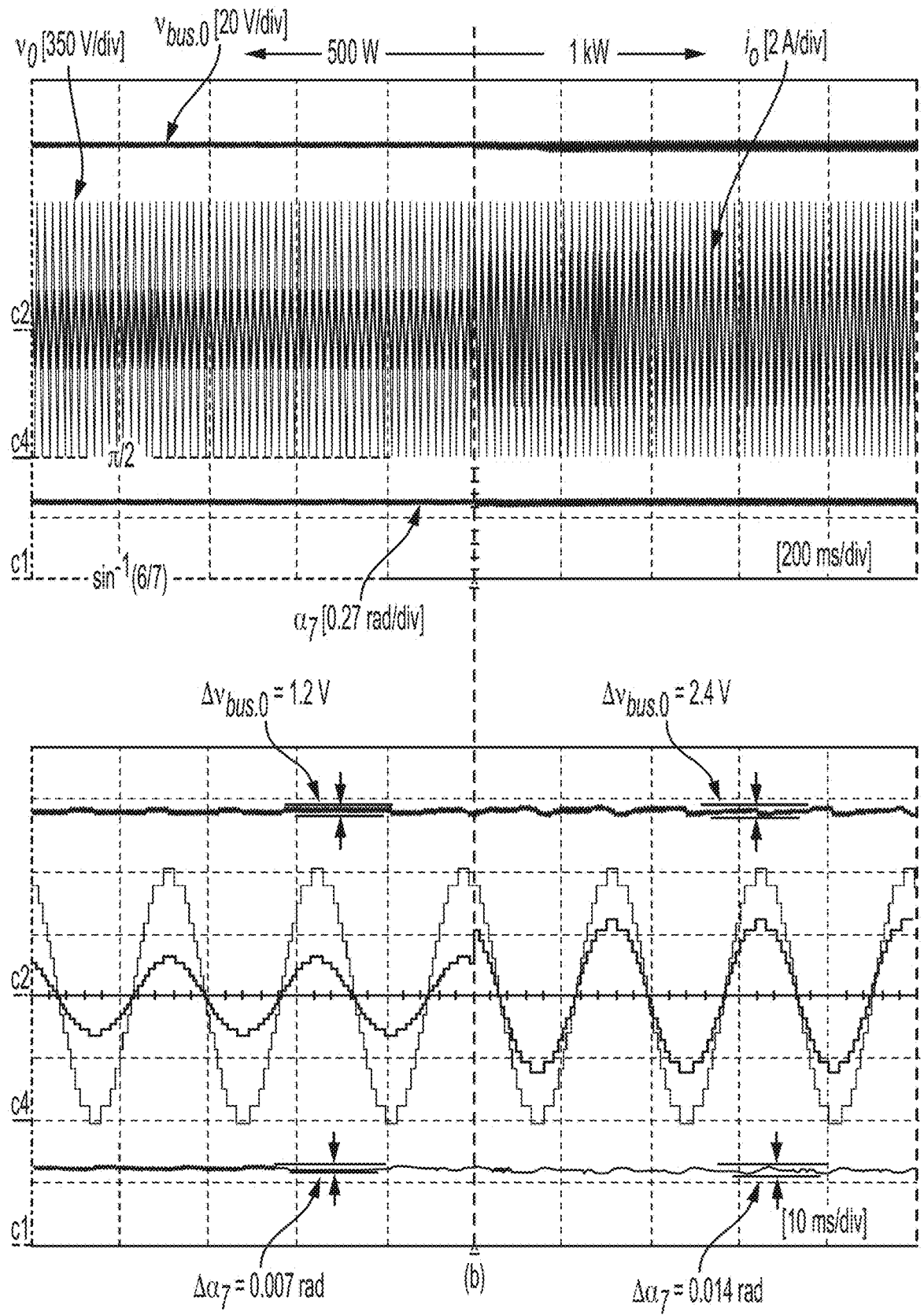
Figure 19C:
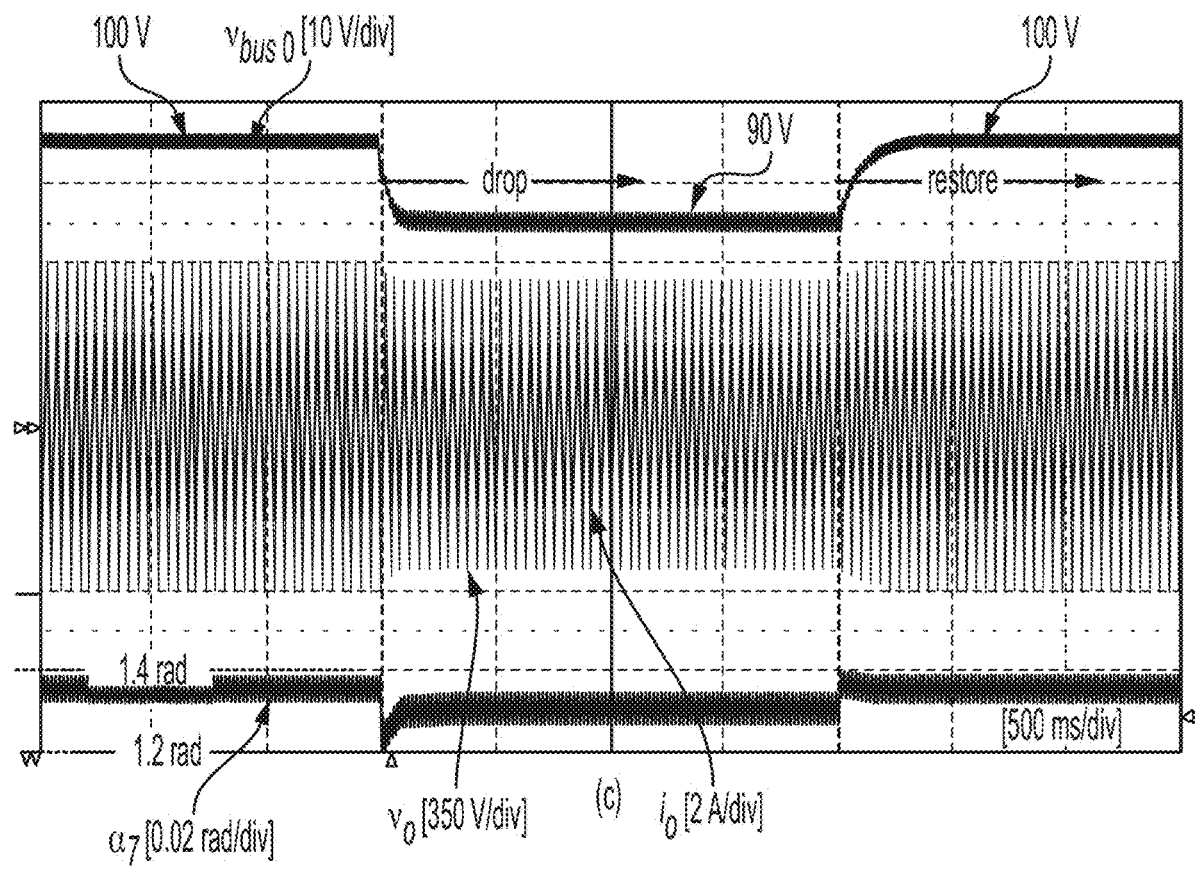

The hybrid BCMLI with the FCV control has been also verified for three transient situations, as shown in FIGS. 19A-19C. First, start-up response of the FCV control at 1 kW condition is tested. Bus voltages $v_{bus.1}$ and $V_{bus.2}$ are regulated to 200 V and 400 V by LLC converters. When the FCV control is activated in FIG. 19A, the control variable $\alpha_7$ starts increasing and comes down to steady-state after remaining at upper limit π/2 for a short duration. Based on the designed PI compensator, the FCV control confirms stable start-up transition and designated $V_{bus.0}$ value after settling time. Second, load transient is tested by load-step from half to full load and shown in FIG. 19B. The proposed FCV control responds with the $\alpha_7$ variation and accomplishes stable load transition. Lastly, the voltage-step transients of the hybrid BCMLI are verified through output voltage drop and restore processes, as shown in FIG. 19C. The dropped period has been continued for 2 seconds and then restored. For drop and restore, the proposed FCV control responds appropriately with settling times of 80 ms and 120 ms, respectively. The experimental waveforms of three transient tests in FIGS. 19A-19C are well-matched to those of simulation results in FIG. 13 and FIG. 14.

Figure 20:
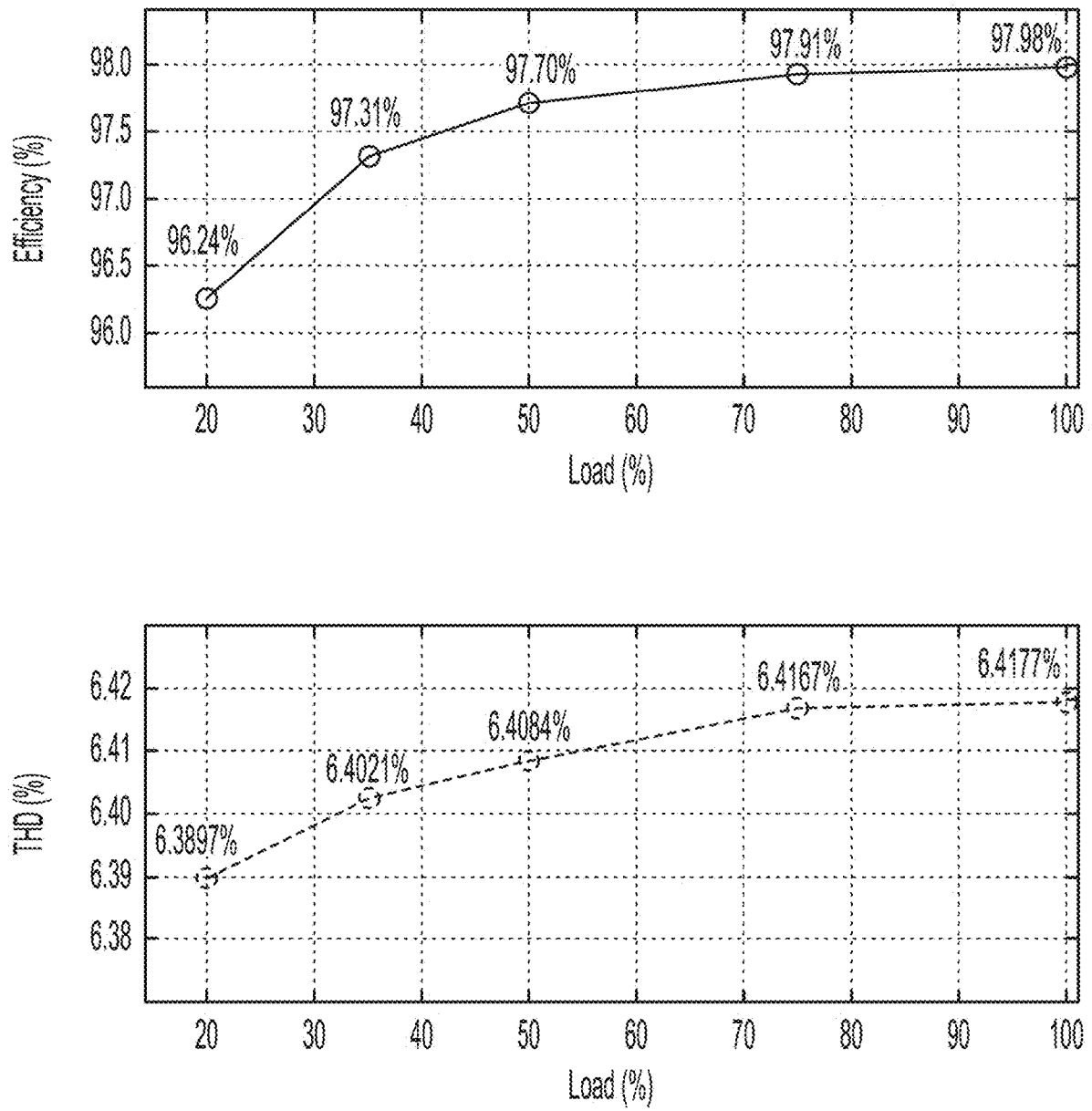
FIG. 20 shows graphs depicting changes in efficiency and total harmonic distortion (THD) over changes in load for the hybrid BCMLI system shown in FIG. 15.

System efficiency and output THD versus load level have been measured and plotted in FIG. 20. For this measurement, different levels of resistive load are used. The efficiency is recorded maximum about 98% at full power and it gets lower with lighter load. Since the CHB stages operate with low fundamental switching frequency, the CHB switching losses are negligible; conduction losses in CHB stages are also relatively small due to low on-resistance utilization of CHB device. It means that the efficiencies of HFL-converters in the hybrid BCMLI are dominant with respect to system efficiency. Therefore, if device operation frequencies and magnetic design of front-end HFL-converters can be optimized to a desirable level in terms of efficiency and loss, it is expected for the hybrid BCMLI to achieve further improvement in the system efficiency.

THD value can serve as a basic index of output-voltage waveform quality. Thus, the asymmetry in waveform caused by floating capacitor voltage ripple can influence the index. However, as can be observed from FIG. 20, the proposed FCV control can provide excellent THD values for wide load range with maximum difference 0.028%. From FIG. 18 and FIG. 20, it can be noted that the hybrid BCMLI topology with the proposed FCV control can maintain the 15-level output voltage waveform and make its THD distortion factor remained at certain range around 6.4% without any inductor or filters.

In some examples, the input terminals of more than one CHB module can be coupled with capacitors. For example, referring to FIG. 2, the HFL circuitry coupled with the second CHB module 210 and providing the voltage $V_{bus.1}$ is replaced with a capacitor $C_{bus.1}$ coupled across the input terminals of the second CHB module 210. The FCV controls system discussed above can be used to maintain the voltage across each floating capacitor.

In some examples, multiple BCMLI systems (such as for example the BCMLI system 200 discussed above in relation to FIG. 2) can be stacked to achieve higher output voltages and/or higher output voltage levels. The multiple BCMLI systems can be coupled in a cascade formation, in a manner similar to how individual CHB modules within the BCMLI system are coupled. That is, the positive output terminal of a BCMLI system is coupled with a negative output terminal of a preceding BCMLI system of the stacked BCMLI systems. The output voltage of the stacked BCMLI system is determined between the positive output terminal of the first BCMLI system in the stack and the negative output terminal of the last BCMLI system in the stack.

Figure 21:
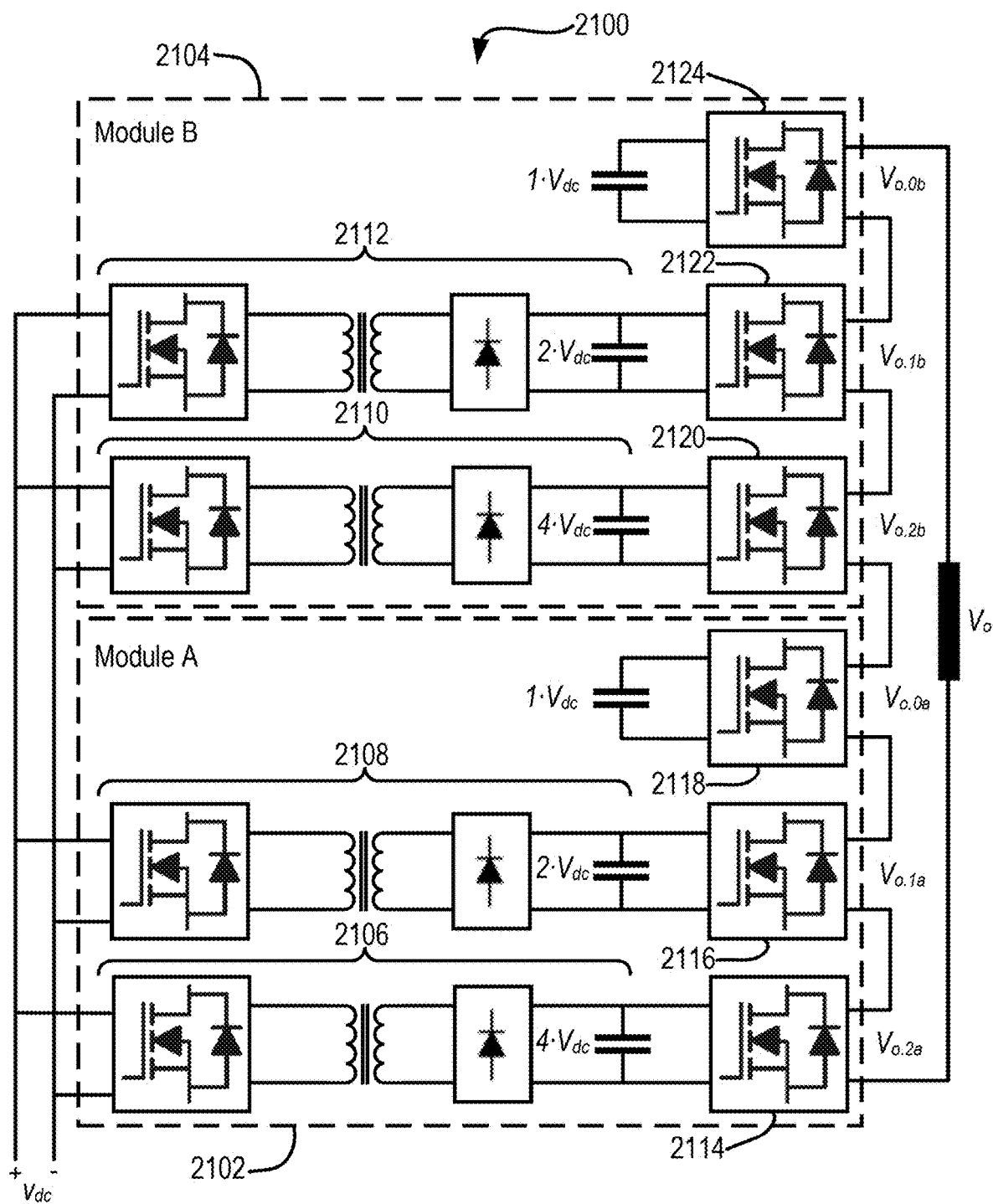
FIG. 21 shows one example configuration of a stacked BCMLI system.

FIG. 21 shows one example configuration of a stacked BCMLI system 2100. The stacked BCMLI system 2100 includes Module A 2102 and Module B 2104, where each of the Module A 2102 and Module B 2104 can include a BCMLI system similar to that discussed above in relation to FIG. 2. For example, Module A 2102 includes a first HFL-converter 2106 and a second HFL-converter 2108, and Module B 2102 includes a third HFL-converter 2110 and a fourth HFL-converter 2112 (details of the HFL-converters are discussed above such as, for example, in relation to FIGS. 2 and 3). The Module A 2102 includes a first CHB module 2114, a second CHB module 2116, and a third CHB module 2118, while the Module B 2104 includes a fourth CHB module 2120, a fifth CHB module 2122, and a sixth CHB module 2124 (details of the CHB modules are discussed above such as, for example, in relation to FIGS. 2 and 4). Input terminals of the first HFL-converter 2106, the second HFL-converter 2108, the third HFL-converter 2110 and the fourth HFL-converter 2112 are coupled with an input voltage $V_{dc}$. The output of the first HFL-converter 2106 is $4V_{dc}$, and the output of the second HFL-converter 2108 is $2V_{dc}$. Similarly, the output of the third HFL-converter 2110 is $4V_{dc}$, and the output of the fourth HFL-converter 2112 is $2V_{dc}$. The outputs of the first HFL-converter 2106 and the second HFL-converter 2108 are respectively coupled with the inputs of the first CHB module 2114 and the second CHB module 2116. The input terminals of the third CHB module 2118 are coupled with a floating capacitor. The Module B 2104 is configured in a manner similar to Module A 2102. The output terminals of the CHBs of are coupled in a cascade configuration. And the output voltage $V_o$ is measured between the positive terminal of the sixth CHB module 2124 and the negative terminal of the first CHB module 2114. Table VII below provides an example binary-code truth table for the BCMLI modulations. Based on the structure in FIG. 21 and FIG. 5 (in relation to each module), the stacked BCMLI system 2100 can synthesize 29 level output from $+14 \cdot V_{dc}$ to $-14 \cdot V_{dc}$.

While FIG. 21 shows only two stacked BCMLI modules, it is understood that more than two BCMLI modules can be stacked in a manner similar to that shown in FIG. 21. Further, in some examples, the number of CHBs or the number of HFL-converters in at least one module can be different from the corresponding number of CHBs or HFL converters in another module. Similarly, one or more modules can have none or more than one CHBs that have their respective input terminals coupled with a floating capacitor.

TABLE VII

MODULATION SCHEMES OF STACKED BCMLI

| | Module a | | | | | Module b | | | | |
|---|---|---|---|---|---|---|---|---|---|---|
| $V_o$ | $V_{o.2a}$ | $V_{o.1a}$ | $V_{o.0a}$ | FCV-a | Circuit | $V_{o.2b}$ | $V_{o.1b}$ | $V_{o.0b}$ | FCV-b | Circuit |
| +14 | +4 | +2 | +1 | FC discharged | C | +4 | +2 | +1 | FC discharged | C |
| +13 | +4 | +2 | 0 | | | +4 | +2 | +1 | FC discharged | C |
| +12 | +4 | +2 | 0 | | | +4 | +2 | 0 | | |
| +11 | +4 | +2 | 0 | | | +4 | +2 | −1 | FC charged | B |
| +10 | +4 | +2 | 0 | | | +4 | 0 | 0 | | |
| +9 | +4 | +2 | −1 | FC charged | B | +4 | 0 | 0 | | |
| +8 | +4 | 0 | 0 | | | +4 | 0 | 0 | | |
| +7 | +4 | 0 | −1 | FC charged | B | +4 | 0 | 0 | — | |
| +6 | +4 | 0 | 0 | | | 0 | +2 | 0 | | |
| +5 | 0 | +2 | 0 | | | +4 | 0 | −1 | FC charged | B |
| +4 | 0 | +2 | 0 | | | 0 | +2 | 0 | | |
| +3 | 0 | +2 | −1 | FC charged | B | 0 | +2 | 0 | — | |
| +2 | 0 | +2 | 0 | | | 0 | 0 | 0 | | |
| +1 | 0 | 0 | 0 | | | 0 | +2 | −1 | FC charged | B |
| 0 | 0 | 0 | 0 | | | 0 | 0 | 0 | | |
| −1 | 0 | 0 | 0 | | | 0 | 0 | +1 | FC charged | A |
| −2 | 0 | 0 | 0 | | | 0 | −2 | 0 | | |
| −3 | 0 | 0 | −1 | FC charged | A | 0 | −2 | 0 | | |
| −4 | 0 | −2 | 0 | | | 0 | −2 | 0 | | |
| −5 | 0 | −2 | −1 | | | 0 | −2 | 0 | | |
| −6 | −4 | 0 | 0 | FC charged | A | 0 | −2 | 0 | | |
| −7 | −4 | 0 | 0 | | | −4 | 0 | +1 | FC charged | A |
| −8 | −4 | 0 | 0 | | | −4 | 0 | 0 | | |
| −9 | −4 | −2 | +1 | FC charged | A | −4 | 0 | 0 | | |
| −10 | −4 | −2 | 0 | | | −4 | 0 | 0 | | |
| −11 | −4 | −2 | 0 | | | −4 | −2 | +1 | FC charged | A |
| −12 | −4 | −2 | 0 | | | −4 | −2 | 0 | | |

TABLE VII-continued

MODULATION SCHEMES OF STACKED BCMLI

| | Module a | | | | | Module b | | | | |
|---|---|---|---|---|---|---|---|---|---|---|
| $V_o$ | $V_{o.2a}$ | $V_{o.1a}$ | $V_{o.0a}$ | FCV-a | Circuit | $V_{o.2b}$ | $V_{o.1b}$ | $V_{o.0b}$ | FCV-b | Circuit |
| −13 | −4 | −2 | 0 | | | −4 | −2 | −1 | FC discharged | D |
| −14 | −4 | −2 | −1 | FC discharged | D | −4 | −2 | −1 | FC discharged | D |

VI. CONCLUSION

At least one embodiment of a single-source hybrid BCMLI system based on front-end HFL-converters has been discussed herein. The system regulates three bus voltages in binary proportion (e.g., as $(1:2:4) \cdot V_{dc}$) by the proposed FCV control and HFL-converters. Back-end CHB stages synthesize a multi-level (e.g., 15-levels, 7-levels, etc.) output voltage waveform. Compared to conventional HFL-based BCMLI, the proposed system can remove one or more HFL-converters for an input DC bus so that component counts, size and cost can be significantly reduced. The FCV control can achieve both charge-balancing and average voltage regulation of the floating capacitor without losing modulation index. While removing a part of front-end converters, input-output galvanic isolation and high step-up gain are still obtainable with remained HFL-converters; a wide range of power-factor operations including purely reactive load is another advantage of the FCV control. The comparative assessment with state-of-the-art hybrid MLI topologies confirms that concurrent attainment of high step-up gain, isolation capability and highly reactive-power supply is provided by the topology. Thus, it can be concluded that the hybrid BCMLI with proposed FCV control has competitiveness in high-voltage high-power inverter applications.

References: All cited references, patent or literature, are incorporated by reference in their entirety. The examples disclosed herein are illustrative and not limiting in nature. Details disclosed with respect to the methods described herein included in one example or embodiment may be applied to other examples and embodiments. Any aspect of the present disclosure that has been described herein may be disclaimed, i.e., exclude from the claimed subject matter whether by proviso or otherwise.

[1] J.-S. Lai, and F. Z. Peng, "Multilevel Converters—A New Breed of Power Converters," *IEEE Trans. on Industry Applications*, vol. 32, no. 3, pp. 509-517, May/June 1996.

[2] J. Rodriguez, J.-S. Lai, and F. Z. Peng, "Multilevel Inverters: A Survey of Topologies, Controls, and Applications," *IEEE Trans. on Industrial Electronics*, vol. 49, no. 4, pp. 724-738, August 2002.

[3] C.-S. Yeh, C.-W. Chen, M. Lee and J.-S. Lai, "A Hybrid Modulation Method for Single-Stage Soft-Switching Inverter Based on Series Resonant Converter," *IEEE Trans. on Power Electronics, Early Access*, DOI: 10.1109/TPEL.2019.2948122, 2019.

[4] M. Vijeh, M. Rezanejad, E. Samadaei, and K. Bertilsson, "A General Review of Multilevel Inverters Based on Main Submodules: Structural Point of View," *IEEE Trans. on Power Electronics*, vol. 34, no. 10, pp. 9479-9502, October 2019.

[5] Y.-S Lai, and F.-S. Shyu, "Topology for hybrid multilevel inverter," *IEE Proceedings of Electric Power Applications*, vol. 149, no. 6, pp. 449-458, November 2002.

[6] D. A. B. Zambra, C. Rech, and J. R. Pinheiro, "Comparison of Neutral-Point-Clamped, Symmetrical, and Hybrid Asymmetrical Multilevel Inverters," *IEEE Trans. on Industrial Electronics*, vol. 57, no. 7, pp. 2297-2306, July 2010.

[7] E. E. Espinosa, J. R. Espinoza, P. E. Melin, R. O. Ramirez, R. Villarroel, J. A. Munoz, and L. Moran, "A New Modulation Method for a 13-Level Asymmetric Inverter Toward Minimum THD," *IEEE Trans. on Industry Applications*, vol. 50, no. 3, pp. 1924-1933, May/June 2014.

[8] T. D. C. Busarello, A. Mortezaei, H. K. M. Paredes, A. Al-Durra, J. A. Pomilio, and M. G. Simoes, "Simplified Small-Signal Model for Output Voltage Control of Asymmetric Cascaded H-Bridge Multilevel Inverter," *IEEE Trans. on Power Electronics*, vol. 33, no. 4, pp. 3509-3519, April 2018.

[9] M. D. Manjrekar, P. K. Steimer, and T. A. Lipo, "Hybrid Multilevel Power Conversion System: A Competitive Solution for High-Power Applications," *IEEE Trans. on Industry Applications*, vol. 36, no. 3, pp. 834-841, May/June 2000.

[10] J. Dixon, J. Pereda, C. Castillo, and S. Bosch, "Asymmetrical Multilevel Inverter for Traction Drives Using Only One DC Supply," *IEEE Trans. on Vehicular Technology*, vol. 59, no. 8, pp. 3736-3743, October 2010.

[11] J. Pereda, and J. Dixon, "High-Frequency Link: A Solution for Using Only One DC Source in Asymmetric Cascaded Multilevel Inverters," *IEEE Trans. on Industrial Electronics*, vol. 58, no. 9, pp. 3884-3892, September 2011.

[12] J. Pereda, and J. Dixon, "Cascaded Multilevel Converters: Optimal Asymmetries and Floating Capacitor Control," *IEEE Trans. on Industrial Electronics*, vol. 60, no. 11, pp. 4784-4793, November 2013.

[13] M. S. Manoharan, A. Ahmed, and J.-H. Park, "A PV Power Conditioning System Using Nonregenerative Single-Sourced Trinary Asymmetric Multilevel Inverter With Hybrid Control Scheme and Reduced Leakage Current," *IEEE Trans. on Power Electronics*, vol. 32, no. 10, pp. 7602-7614, October 2017.

[14] A. Ahmed, M. S. Manoharan, and J.-H. Park, "An Efficient Single-Sourced Asymmetrical Cascaded Multilevel Inverter With Reduced Leakage Current Suitable for Single-Stage PV Systems," *IEEE Trans. on Energy Conversion*, vol. 34, no. 1, pp. 211-220, March 2019.

[15] S. Vazquez, J. I. Leon, L. G. Franquelo, J. J. Padilla, and J. M. Carrasco, "DC-Voltage-Ratio Control Strategy for Multilevel Cascaded Converters Fed With a Single DC Source," *IEEE Trans. on Industrial Electronics*, vol. 56, no. 7, pp. 2513-2521, July 2009.

[16] H. Sepahvand, J. Liao, M. Ferdowsi, and K. A. Corzine, "Capacitor Voltage Regulation in Single-DC-Source Cascaded H-Bridge Multilevel Converters Using Phase-Shift Modulation," *IEEE Trans. on Industrial Electronics*, vol. 60, no. 9, pp. 3619-3626, September 2013.

[17] S. Ziaeinejad, A. Mehrizi-Sani, "PWM A-CHB Converter Based on Trinary Multilevel Converter: Topology, Switching Algorithm, and Stability Analysis," *IEEE Trans. on Industrial Electronics*, vol. 66, no. 6, pp. 4166-4176, June 2019.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A multi-level inverter, comprising:
   n H-bridge cells, each H-bridge cell of the n H-bridge cells configured to selectively provide at its output terminals one of: a zero voltage, a positive polarity of a voltage at its input terminals, and a negative polarity of the voltage at its input terminals, wherein the corresponding input terminals of each H-bridge cell of the n H-bridge cells is configured to be coupled to one of n DC voltage sources, wherein at least two of the n DC voltage sources have different voltage magnitudes;
   m H-bridge cells, each H-bridge cell of the m H-bridge cells having a capacitor coupled in parallel with its input terminal, the each H-bridge cell of the m H-bridge cells configured to selectively provide one of: charging the capacitor from its output terminals, discharging the capacitor to its output terminals, and providing zero voltage at its output terminals, wherein the n H-bridge cells and the m H-bridge cells are connected in a cascade formation such that a voltage output of the multi-level inverter is equal to at least a sum of output voltages of the n H-bridge cells and the m H-bridge cells; and
   a controller coupled with the n H-bridge cells and the m H-bridge cells configured to:
      determine a first half-cycle period and a second subsequent half-cycle period of a same duration as the first half-cycle period, each of the first half-cycle period and the second half-cycle period including a set of switching instances, wherein each switching instance in the set of switching instances is determined at least in part based upon the voltage magnitudes of each of the n DC voltage sources, and
      selectively control the n H-bridge cells and the m H-bridge cells at each switching instance of the set of switching instances of the first half-cycle period to generate a step-wise increasing followed by a step-wise decreasing voltage output of the multi-level inverter and selectively control the n H-bridge cells and the m H-bridge cells at each switching instance of the set of switching instances of the second half-cycle period to generate a step-wise decreasing followed by a step-wise increasing voltage output of the multi-level inverter.

2. The multi-level inverter of claim 1, further comprising the n DC voltage sources, wherein the corresponding input terminals of each H-bridge cell of the n H-bridge cells is coupled to a DC voltage source of the n DC voltage sources.

3. The multi-level inverter of claim 1, wherein the n DC voltage sources have progressively increasing voltage values.

4. The multi-level inverter of claim 3, wherein the n DC voltage sources have values progressively increasing by a power of 2.

5. The multi-level inverter of claim 1, wherein the controller is configured to selectively control at least one H-bridge cell of the m H-bridge cells to discharge the respective capacitor to its respective output terminals when the voltage output of the multi-level inverter is at its peak positive or peak negative value.

6. The multi-level inverter of claim 5, wherein the controller is configured to selectively control at least one H-bridge cell of the m H-bridge cells to charge the respective capacitor from its respective output terminals when the voltage output of the multi-level inverter is not at its peak positive or peak negative value.

7. The multi-level inverter of claim 1, wherein n of the n H-bridge cells is greater than m of the m H-bridge cells.

8. The multi-level inverter of claim 7, wherein the controller configured to vary the at least one switching instance of the set of switching instances in the first half-cycle and the second half-cycle to maintain average voltages of the at least one capacitor associated with the m H-bridge cells at their corresponding predetermined value.

9. The multi-level inverter of claim 8, wherein the controller is configured to vary at least one switching instance of the set of switching instances in the first half-cycle and the second half-cycle such that an average charge into at least one capacitor associated with the m H-bridge cells is substantially equal to zero over the first half-cycle and second half-cycle.

10. The multi-level inverter of claim 9, wherein the at least one switching instance is associated with the output voltage of the multi-level inverter having a positive or negative peak value.

11. The multi-level inverter of claim 1, wherein the controller configured to vary at least one switching instance of the set of switching instances in the first half-cycle and the second half-cycle based on deviation of voltage of at least one capacitor associated with the m H-bridge cells from their corresponding predetermined value.

12. A method for controlling a multi-level inverter including:
   n H-bridge cells, each H-bridge cell of the n H-bridge cells configured to selectively provide at its output terminals one of: a zero voltage, a positive polarity of a voltage at its input terminals, and a negative polarity of the voltage at its input terminals, wherein the corresponding input terminals of each H-bridge cell of the n H-bridge cells is configured to be coupled to one of n DC voltage sources, wherein at least two of the n DC voltage sources has a different voltage magnitudes; and
   m H-bridge cells, each H-bridge cell of the m H-bridge cells having a capacitor coupled in parallel with its input terminal, each H-bridge cell configured to selectively provide one of: a charging the capacitor from its output terminals, a discharging the capacitor to its output terminals, and a providing zero voltage at its output terminals, wherein the n H-bridge cells and the m H-bridge cells are connected in a cascade formation such that a voltage output of the multi-level inverter is equal to at least a sum of output voltages of the n H-bridge cells and the m H-bridge cells, the method comprising:
   determining a first half-cycle period and a second subsequent half-cycle period of a same duration as the first half-cycle period, each of the first half-cycle period and the second half-cycle period including a set of switching instances, wherein each switching instance in the set of switching instances is determined at least in part based upon the voltage magnitudes of each of the n DC voltage sources, selectively controlling the n H-bridge cells and the m H-bridge cells at each switching instance of the set of switching instances of the first half-cycle period to generate a step-wise increasing followed by a step-wise decreasing voltage output of the multi-level inverter, and selectively controlling the n H-bridge cells and the m H-bridge cells at each switching instance of the set of switching instances of the second half-cycle period to generate a step-wise decreasing followed by a step-wise increasing voltage output of the multi-level inverter.

13. The method of claim 12, wherein the n DC voltage sources have progressively increasing voltage values.

14. The method of claim 13, wherein the n DC voltage sources have values progressively increasing by a power of 2.

15. The method of claim 12, further comprising:
selectively controlling at least one H-bridge cell of the m H-bridge cells to discharge the respective capacitor to its respective output terminals when the voltage output of the multi-level inverter is at its peak positive or peak negative value.

16. The method of claim 12, further comprising:
selectively controlling at least one H-bridge cell of the m H-bridge cells to charge the respective capacitor from its respective output terminals when the voltage output of the multi-level inverter is not at its peak positive or peak negative value.

17. The method of claim 12, wherein n of the n H-bridge cells is greater than m of the m H-bridge cells.

18. The method of claim 17, further comprising:
varying the at least one switching instance of the set of switching instances in the first half-cycle and the second half-cycle to maintain average voltages of the at least one capacitor associated with the m H-bridge cells at their corresponding predetermined value.

19. The method of claim 12, further comprising:
varying at least one switching instance of the set of switching instances in the first half-cycle and the second half-cycle based on deviation of voltage of at least one capacitor associated with the m H-bridge cells from their corresponding predetermined value.

20. The method of claim 12, further comprising:
varying at least one switching instance of the set of switching instances in the first half-cycle and the second half-cycle such that an average charge into at least one capacitor associated with the m H-bridge cells is substantially equal to zero over the first half-cycle and second half-cycle.

21. The method of claim 20, wherein the at least one switching instance is associated with the output voltage of the multi-level inverter having a positive or negative peak value.

22. The method of claim 12, wherein the multi-level inverter further includes the n DC voltage sources, wherein the corresponding input terminals of each H-bridge cell of the n H-bridge cells is coupled to a DC voltage source of the n DC voltage sources.

* * * * *